US008423898B2

(12) United States Patent
Hale et al.

(10) Patent No.: US 8,423,898 B2
(45) Date of Patent: Apr. 16, 2013

(54) SYSTEM AND METHOD FOR PERFORMING CALCULATIONS USING A PORTABLE ELECTRONIC DEVICE

(75) Inventors: Presley Eugene Hale, La Puente, CA (US); Daniel Eugene Hale, Encinitas, CA (US); Brent Foust, Bonita, CA (US)

(73) Assignee: Hale Software Concepts, Inc., Encinitas, CA (US)

( * ) Notice: Subject to any disclaimer, the term of this patent is extended or adjusted under 35 U.S.C. 154(b) by 166 days.

(21) Appl. No.: 12/861,055

(22) Filed: Aug. 23, 2010

(65) Prior Publication Data
US 2012/0047453 A1 Feb. 23, 2012

(51) Int. Cl.
*G06F 3/048* (2006.01)
(52) U.S. Cl.
USPC .......................... 715/773; 715/774; 715/764
(58) Field of Classification Search .................. None
See application file for complete search history.

(56) References Cited

U.S. PATENT DOCUMENTS

| 5,067,102 | A | 11/1991 | Eisenstein |
| 5,243,550 | A | 9/1993 | Cannizzaro |
| 5,819,293 | A * | 10/1998 | Comer et al. ........................ 1/1 |
| 6,961,898 | B2 * | 11/2005 | Bennett .......................... 715/212 |
| 2005/0033783 | A1 | 2/2005 | de Brebisson |
| 2005/0091292 | A1 | 4/2005 | Pai |
| 2006/0132448 | A1 | 6/2006 | Irons |
| 2008/0126465 | A1 | 5/2008 | Delaney |

OTHER PUBLICATIONS

Unitarium, "Time Calculator", [online], Feb. 2009 (Retrieved), retrieved from the internet: <URL: www.unitarium.com/time-calculator>.*
Microsoft Office, "Send a workbook or worksheet in e-mail", [online], Jun. 2010 (Retrieved), retrieved from the internet: <URL:http://office.microsoft.com/en-us/excel-help/send-a-workbook-or-worksheet-in-e-mail-HP005201209.aspx>.*
"User Manual for the FC Products", Formula Calculator Pty Ltd, 2007-2009, pp. 1-68.
http://www.moffsoft.com/freecalc.htm—Downloaded from the Internet on Aug. 17, 2010.
http://www.sharewareconnection.com/calculator-by-less-mess.htm—Downloaded from the Internet on Aug. 17, 2010.
http://www.themadadder.com/history.html—Downloaded from the Internet on Aug. 17, 2010.
http://www.facebook.com/photo.php?pid=9698788&id=341302010117—Downloaded from the Internet on Aug. 17, 2010.

(Continued)

*Primary Examiner* — Tuyetlien Tran
*Assistant Examiner* — Stella Eun
(74) *Attorney, Agent, or Firm* — Mayer & Williams PC; Mark K. Young

(57) ABSTRACT

An apparatus and method for performing calculations is provided so that a paradigm of a tape is utilized in a calculator application that executes on a computing platform and which is configured to enable a user to see and interact with multiple virtual tapes that each show numerical values and operators. Each tape functions as a user-accessible memory and a memory value may be recalled from any one tape and that value placed on any other tape. The calculator application is configured to enable the user to enter a sequence of values and operators which are all displayable on a given tape, as well as support the user's ability to edit any value or operator that was previously entered on that tape. Calculations are updated to reflect the user's edits on both the tape currently being edited and any other tape that uses the edited tape as a memory.

18 Claims, 26 Drawing Sheets

OTHER PUBLICATIONS http://cccalc.excelsior-usa.com/en/—Downloaded from the internet on Aug. 17, 2010.
http://calcute.com/—Downloaded from the Internet on Aug. 17, 2010.
http://www.top4download.com/superbcalc/theeesok.html—Downloaded from the Internet on Aug. 17, 2010.

Frakes, D., "PCalc for iPhone and iPad," Macworld.com, May 13, 2010, http://macworld.com/appguide/article.htm;?article=151209, retrieved Mar. 30, 2012, 3 pages.
Int'l Search Report and Written Opinion for PCT/US11/047841, dated Mar. 20, 2012, 9 pages.

* cited by examiner

SYSTEM AND METHOD FOR PERFORMING CALCULATIONS USING A PORTABLE ELECTRONIC DEVICE

BACKGROUND

Portable electronic devices such as calculators and multi-purpose computing platforms that can run software applications that provide calculator functionalities typically display information line by line (i.e., one line at a time). Such information may include numerical values that a calculator user enters using a user interface such as a keypad which includes number keys (i.e., buttons) as well as keys for mathematical binary operators and unary functions. Many calculators interpret keystrokes using an immediate execution mode. For binary operations (e.g., addition, subtraction, multiplication, division) in immediate execution mode, intermediate results are calculated as each key is pressed for each operation. The order of operations in mathematical expression is not taken into account by immediate execution mode calculators unless brackets or parentheses are supported by the calculator and utilized by the user. For unary operations (e.g., square root, reciprocal, exponents, etc.), the user keys the numerical value in first, followed by the unary operator. The immediate execution mode of operation compares with that utilized in formula-based calculators where the user types in an entire expression and then presses an "enter" key to evaluate the expression.

Most users find immediate execution mode calculators to be straightforward enough to use, particularly for short and simple calculations. However, even for simple calculations, mistakes can easily be made and be difficult to spot. Errors can occur using many current calculators for a variety of reasons and commonly result because of keystroke errors and/or use of an incorrect sequence of button pushes that misapplies precedence rules when performing calculations of expressions in which the order of operations affects the results. The inability to see prior entries before the current line and the fact that operators are not typically shown on the calculator's line-by-line display can compound difficulties because the user cannot see that an error was made or where in a given calculation it was made. Many calculators support use of a memory feature to help improve calculator functionality (and help address, for example some of the aforementioned issues in operation precedence) by enabling users to store a result of a calculation and then recall the result in a subsequent calculation. However, the number of available memories is typically limited in many consumer-oriented calculators to just one or two. In addition, the calculations used to create the stored results can still be prone to the errors that result from the limitations of the line-by-line display.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An apparatus and method for performing calculations is provided so that a paradigm of a tape, like that employed by a traditional adding machine or printing calculator, is utilized in a calculator application that executes on a computing platform and which is configured to enable a user to see and interact with multiple virtual tapes that each show numerical values and operators using a scrollable user interface window. Each tape functions as a user-accessible memory and a user may recall a memory value (which is typically the last value on the tape) from any one tape and place that value on any other tape, for example, as part of a calculation. The calculator application is configured to enable the user to enter a sequence of values and operators which are all displayable on a given tape, as well as support the user's ability to edit any value or operator that was previously entered on that tape. The calculator application will update the calculations to reflect the user's edit on both the tape currently being edited and any other tape that uses the edited tape as a memory.

In various illustrative examples, the calculator application is embodied substantially using software that executes on a portable electronic device such as a smartphone or personal media player. The calculator application enables the user to name tapes as well as provide textual comments and line-annotations on the tapes. A memories window is supported by the calculator application's user interface so that the user can see a summary of tape names and memory values before recalling a value. Multiple different calculations may be included on a tape and calculations using various units of time (e.g., hours, minutes, seconds, days, months, years) are supported by the calculator application. The calculator application is also configured with functionality to e-mail tapes selected by the user to specified recipients.

Advantageously, the calculator application provides enhanced features and functionalities, compared to ordinary conventional calculators, that can typically be expected to increase productivity, improve the quality of the user experience when performing calculations, and reduce the occurrence of errors. In particular, the ability to see an entire chain of calculations, including all values and operators, and edit the values and operators to make desired changes facilitates much more user control over calculations and provides a visual confirmation of values and operators so that longer or more complex calculations can be performed with a high degree of confidence in the calculated result. In addition, the calculator application's support for multiple tapes, each of which functions as a memory to the other tapes provides additional flexibility when performing calculations. The textual commenting and annotation features provide the user with more options to organize and track calculations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
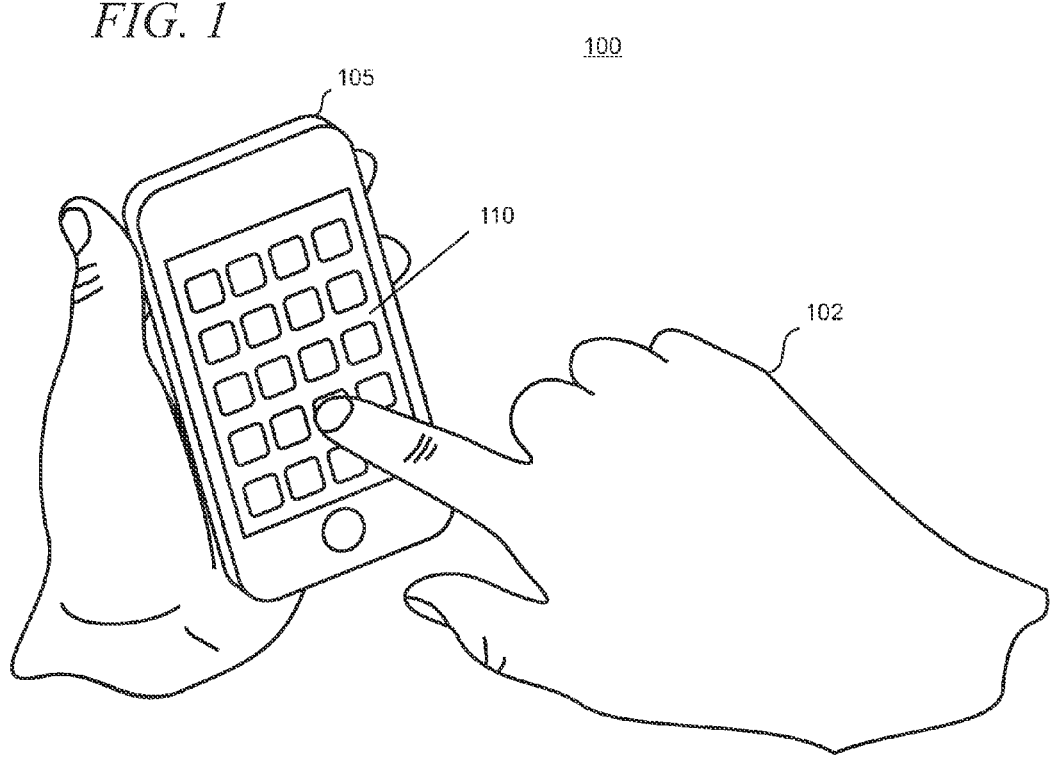
FIG. 1 depicts an illustrative portable computing environment in which a user interacts with an electronic device that supports a touchscreen.

FIG. 1 shows an illustrative computing environment 100 in which a user 102 interacts with an electronic device 105 which supports the present calculator application using a touchscreen 110 that is integrated into the device. Device 105, as shown in FIG. 1, may typically be configured as a portable electronic device or information appliance such as a mobile phone, smart phone, PDA (personal digital assistant), ultra-mobile PC (personal computer), tablet PC, handheld game device, digital media player, digital camera, and the like. For example, the electronic device 105 could be a digital media player such as the iPod™ made available by Apple Computer or a personal e-mail appliance such as the Blackberry™ made available by Research in Motion. Devices including telephony capabilities such as Apple Computer's iPhone™ may also be utilized to support the present calculator application. Larger form-factor devices such as Apple Computer's iPad™ are also contemplated as being suitable platforms in some implementations of the calculator application.

Typically, the touchscreen 110 is made up of a touch-sensor component that is constructed over a display component. The display component displays images in a manner similar to that of a typical monitor on a PC or laptop computer. In many applications, the device 105 will use a liquid crystal display ("LCD") due to its light weight, thinness, and low cost. However, in alternative applications, other conventional display technologies may be utilized including, for example, cathode ray tubes ("CRTs"), plasma-screens, and electro-luminescent screens.

The touch sensor component sits on top of the display component. The touch sensor is transparent so that the display can be seen through it. Many different types of touch sensor technologies are known and may be applied as required to meet the needs of a particular implementation. These include resistive, capacitive, near field, optical imaging, strain gauge, dispersive signal, acoustic pulse recognition, infrared, and surface acoustic wave technologies, among others. Some current touchscreens can discriminate among multiple, simultaneous touch points and/or are pressure-sensitive. Interaction with the touchscreen 110 is typically accomplished using fingers or thumbs, or for non-capacitive type touch sensors, a stylus may also be used.

Figure 2:
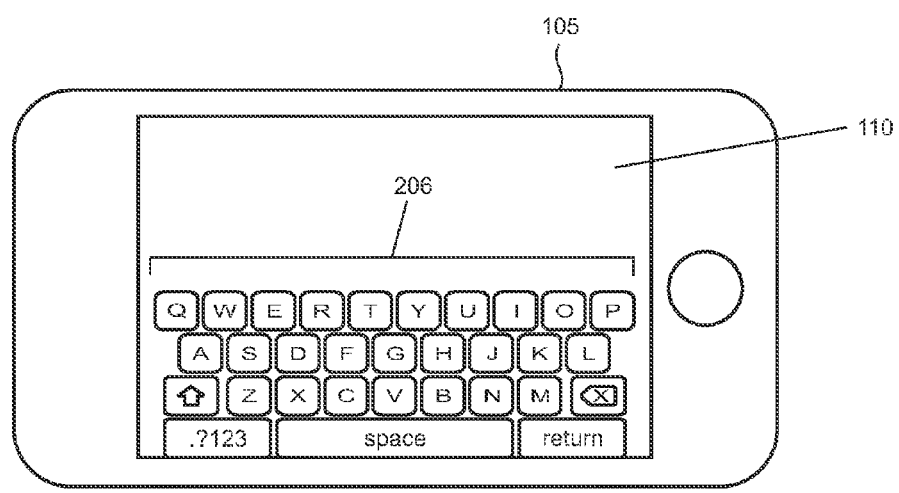
FIG. 2 shows an alternative landscape orientation for an electronic device that displays a virtual keyboard on the touchscreen.

FIG. 2 shows an alternative landscape orientation for the electronic device 105 that may be utilized in some cases where the long axis of the device is substantially parallel to the plane of the ground. The electronic device here is arranged to switch the touchscreen to either landscape mode or portrait mode (where the long axis is substantially orthogonal to the plane of the ground) either via user selection or automatically, for example, through use of an accelerometer or other device that can sense the orientation of the electronic device 105 when held by the user 102. FIG. 2 also depicts the electronic device displaying a virtual keyboard 206 on the touchscreen 110. The virtual keyboard 206 includes a plurality of icons that represent keycaps of a conventional keyboard, as shown. Touchscreen 110 will typically provide other functionalities such as a display area or editing window (not shown in FIG. 2) which shows the characters (i.e., letters, numbers, symbols) being typed by the user on the virtual keyboard 206.

Figure 3:
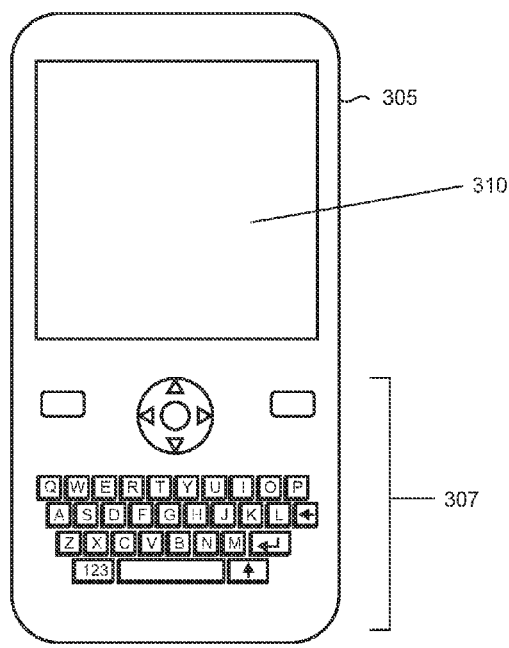
FIG. 3 shows an illustrative example of an electronic device that utilizes physical controls.
Figure 4:
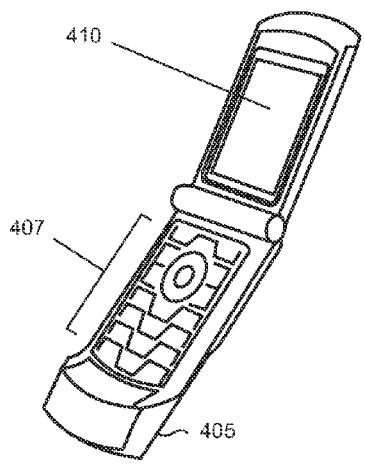
FIG. 4 depicts an illustrative example of an electronic device that uses a flip, or clamshell form factor.

FIG. 3 shows an alternative form-factor for an electronic device 305 that can be used to support the calculator application. Electronic device 305 uses physical controls 307 (e.g., buttons, keyboard, and the like) to replace or supplement the user interface that may be provided by a touchscreen 310. FIG. 4 shows another alternative form-factor for an electronic device 405 that can be used to support the calculator application. Such device is often referred to as a "flip" or "clamshell" design which typically utilizes physical controls 407 in combination with a touchscreen or a non-touch-sensitive display 410. "Slider" type electronic devices, among other types, are also contemplated as being usable for supporting the calculator application in some cases.

Figure 5:
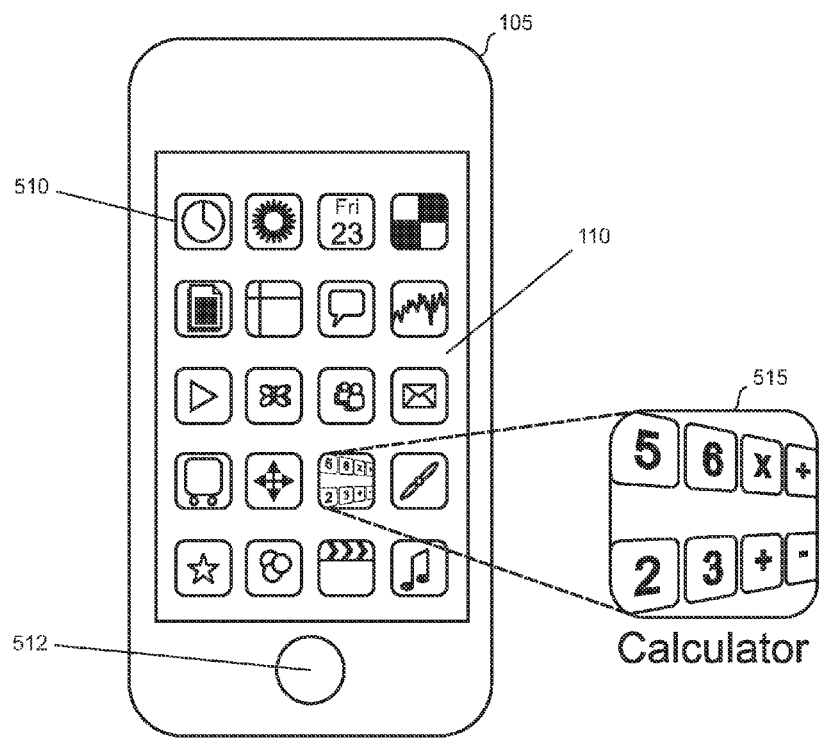
FIG. 5 depicts an illustrative touchscreen that supports user interaction through icons.

FIG. 5 shows that the touchscreen 110 can support user interaction through displayed icons (representatively indicated by reference numeral 510) to facilitate user control, input, or navigation. In some cases, physical controls such as buttons, switches, and the like (represented by button 512) may be used to supplement or replace the icons 510 displayed on the touchscreen 110. The icons 510 may represent content such as files, documents, pictures, music, etc., that is stored or otherwise available (e.g., through a network or other connection) on the device 105. In this illustrative example, the icons represent various applications that are installed on the electronic device 105 that the user may access. The calculator application is represented by icon 515.

Figure 6:
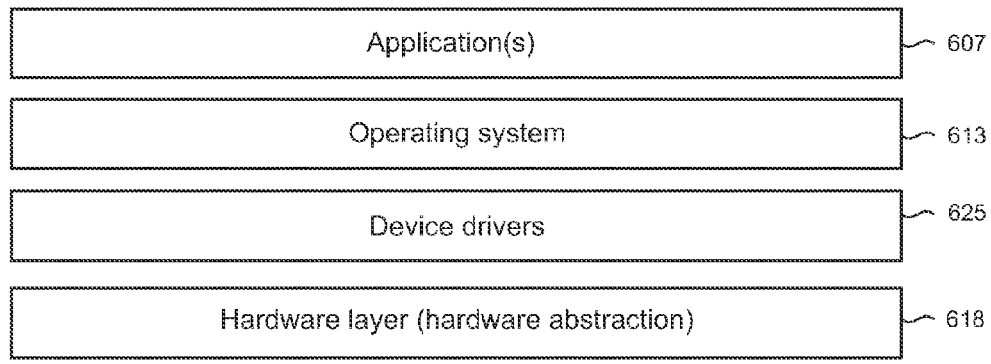
FIG. 6 depicts an illustrative software architecture that may be supported on an electronic device.

The calculator application is typically implemented using device- or machine-executable code that may be arranged in an application layer as shown in the software architecture 600 depicted in FIG. 6 which is operable on the electronic device 105. Thus, the application layer will generally include one or more applications 607 each of which will typically be represented by an icon 510 (FIG. 5) that is displayed on the touchscreen 110. The applications 607 interact with the operating system 613 which provides various methods, and functions required for the applications to provide their intended functionality. The operating system 613 also implements interfaces to various functional components that are abstracted in a hardware layer 618 using, for example, respective device drivers 625.

Figure 7:
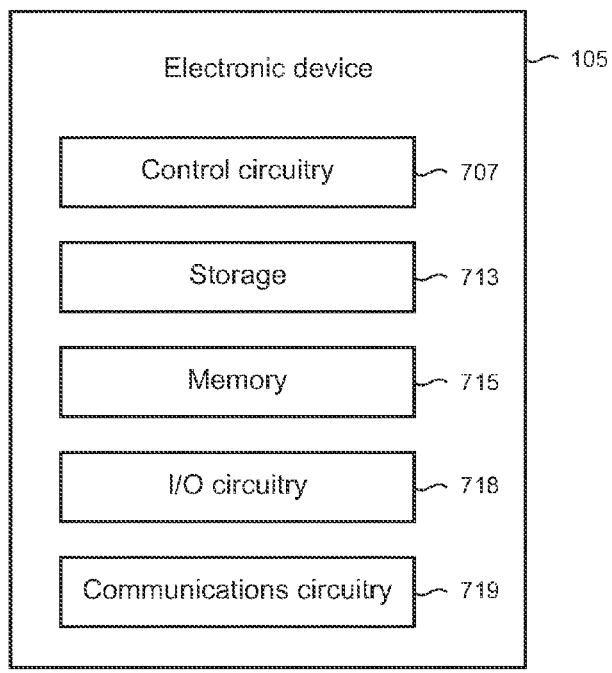
FIG. 7 is a schematic view of functional components in an illustrative electronic device.

FIG. 7 is a schematic view 700 of functional components that may be included in the electronic device 105. Control circuitry 707 may include any processing circuitry or processor operative to control the operations and performance of the electronic device 105. For example, control circuitry 707 can be used to run the operating system 613, firmware that is operable on the electronic device 105, media playback, media editing, or other capabilities, features, and applications. In some implementations, the control circuitry 707 can drive a display and process inputs received from a user interface.

Storage 713 can include, for example, one or more storage media including a hard-drive, solid state drive, flash memory, permanent memory such as ROM (read-only memory), any other suitable type of storage component, or any combination thereof. Storage 713 can store, for example, media data (e.g., music and video files), application data (e.g., for implementing functions on electronic device 105), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 105 to establish a wireless connection), subscription information data (e.g., information that keeps track of podcasts or television shows or other media a user subscribes to), contact information data (e.g., telephone numbers and e-mail addresses), calendar information data, and any other suitable data, or any combination thereof.

Memory 715 can include cache memory, semi-permanent memory such as RAM (random access memory), and/or one or more different types of memory used for temporarily storing data. In some implementations, memory 715 can also be used for storing data used to operate electronic device applications, or any other type of data that can be stored in storage 713. In some implementations, memory 715 and storage 713 can be combined as a single storage medium.

I/O (input/output) circuitry 718 can be operative to convert (and encode/decode, if necessary) analog signals and other signals into digital data. In some implementations, I/O circuitry 718 can also convert digital data into any other type of signal, and vice-versa. For example, I/O circuitry 718 can receive and convert physical contact inputs (e.g., from a multi-touchscreen), physical movements (e.g., from a mouse or sensor), analog audio signals (e.g., from a microphone), or any other input. The digital data can be provided to and received from control circuitry 707, storage 713, memory 715, or any other component of electronic device 105. Although I/O circuitry 718 is illustrated in FIG. 7 as a single component of the electronic device 105, several instances of I/O circuitry 718 can be included in electronic device 105 in some implementations.

Electronic device 105 can include any suitable interface or component for allowing a user to provide inputs to I/O circuitry 718. For example, the electronic device 105 can include any suitable input mechanism, such as for example, a button, keypad, dial, a click wheel, or a touchscreen. In some implementations, the electronic device 105 can include a capacitive sensing mechanism, or a multi-touch capacitive sensing mechanism.

In some implementations, the electronic device 105 can include specialized output circuitry associated with output devices such as, for example, one or more audio outputs. The audio output can include one or more speakers (e.g., mono or stereo speakers) built into electronic device 105, or an audio component that is remotely coupled to electronic device 105 (e.g., a headset, headphones, or earbuds that can be coupled to a communications device with a wire or wirelessly).

In some implementations, I/O circuitry 718 can include display circuitry (e.g., a screen or projection system) for providing a display visible to the user. For example, the display circuitry can include a screen (e.g., an LCD screen) that is incorporated in electronics device 105. As another example, the display circuitry can include a movable display or a projecting system for providing a display of content on a surface remote from electronic device 105 (e.g., a video projector). In some implementations, the display circuitry can include a coder/decoder (codec) to convert digital media data into analog signals. For example, the display circuitry (or other appropriate circuitry within the electronic device 105) can include video codecs, audio codecs, or any other suitable type of codec.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 102. Alternatively, the display circuitry can be operative to provide instructions to a remote display.

Communications circuitry 110 can include any suitable communications circuitry operative to connect to a communications network and to transmit communications (e.g., voice or data) from electronic device 105 to other devices within the communications network. Communications circuitry 110 can be operative to interface with the communications network using any suitable communications protocol such as, for example, Wi-Fi (e.g., an IEEE 802.11 protocol), Bluetooth™, radio frequency systems (e.g., 900 MHz, 1.4 GHz, and 5.6 GHz communication systems), infrared, GSM (Global System for Mobile communications), GSM plus EDGE (Enhanced Data rates for Global Evolution), CDMA (Code Division Multiple Access), quadband and other cellular protocols, VoIP (Voice over Internet Protocol), or any other suitable protocol.

In some implementations, communications circuitry 719 can be operative to create a communications network using any suitable communications protocol. For example, communications circuitry 719 can create a short-range communications network using a short-range communications protocol to connect to other devices. For example, communications circuitry 719 can be operative to create a local communications network using the Bluetooth protocol to couple electronic device 105 with a Bluetooth headset.

Electronic device 105 can include one more instances of communications circuitry 719 for simultaneously performing several communications operations using different communications networks, although only one is shown in FIG. 1 for sake of clarity in the drawing. For example, electronic device 105 can include a first instance of communications circuitry 719 for communicating over a cellular network, and a second instance of communications circuitry 719 for communicating over Wi-Fi or using Bluetooth. In some implementations, the same instance of communications circuitry 719 can be operative to provide for communications over several communications networks.

Figure 8:
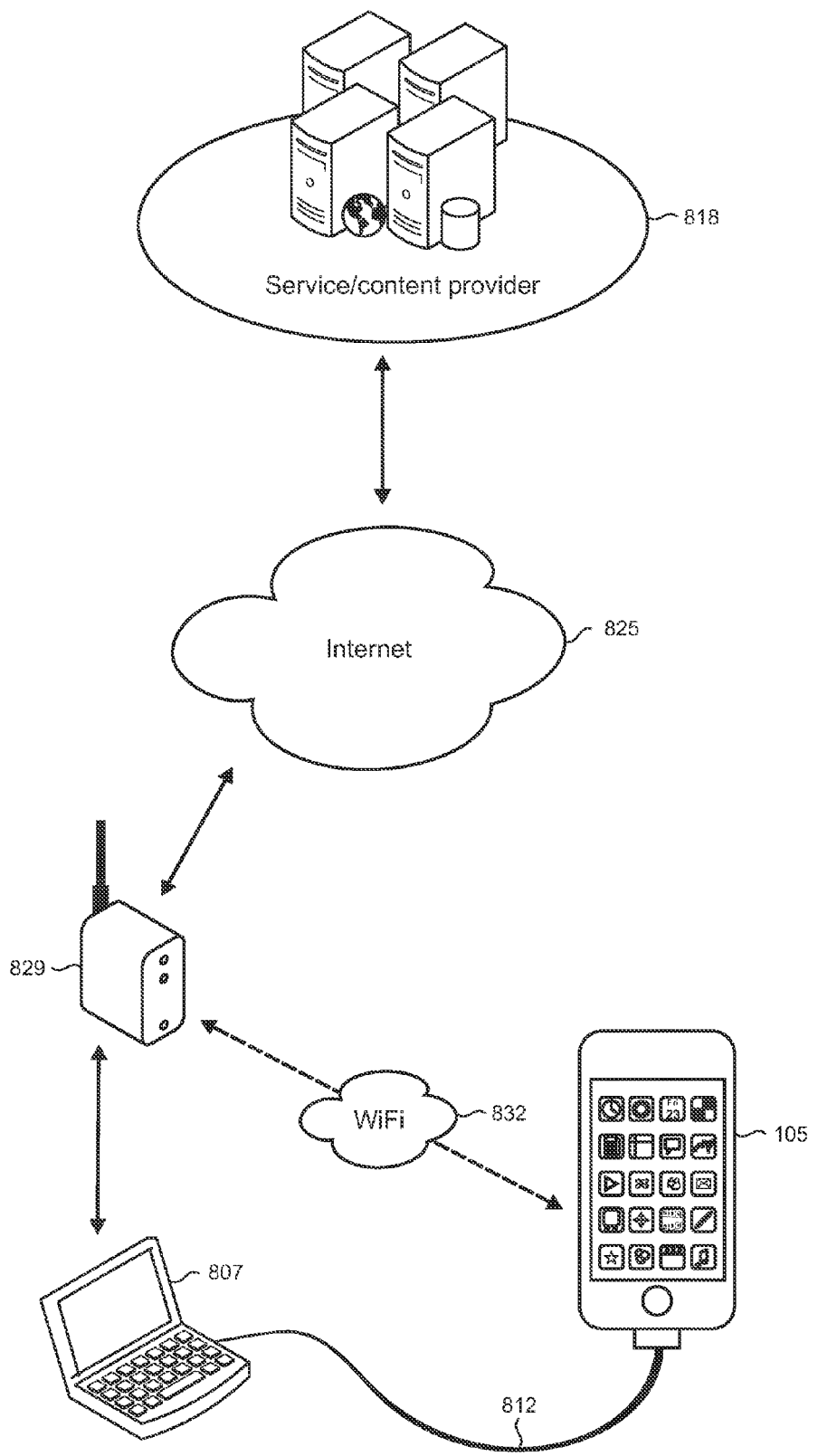
FIG. 8 depicts an illustrative arrangement in which an electronic device is coupled to external computing platforms and service/content providers.

As shown in FIG. 8, in some implementations, the electronic device 105 can be connected to a host device 807 such as a laptop or desktop PC for data transfers, synching the communications device, software or firmware updates, providing performance information to a remote source or server, or performing any other suitable operation that may necessitate the electronic device 105 being connected to the host device 807. A wired connection 812 such as one implemented using the USB (Universal Serial Bus) protocol may be utilized, although wireless connections (not shown in FIG. 8), such as Bluetooth, between the electronic device 105 and the host device 807 are alternatives in some implementations.

Such connection to the host device 807 may also facilitate access to a remote service and/or content provider 818 over the Internet 825. For example, electronic device 105 can access the service/content provider 818 to download, for example, media content (e.g., music, videos, multimedia, etc.) and applications via the host device 807 (which is coupled to the Internet 825 using a network gateway such as a modem 829). Alternatively in some cases, the electronic device 105 may connect directly to the Internet 825 via a Wi-Fi connection 832 to the modem 829 when the modem is configured with Wi-Fi functionality.

Several electronic devices 105 can also be coupled to a single host device 807 using the host device as a server. Alternatively or additionally, the electronic device 105 can be coupled to several host devices (e.g., to each of the plurality of the host devices to serve as a backup for data stored in electronic device 105).

Figure 9:
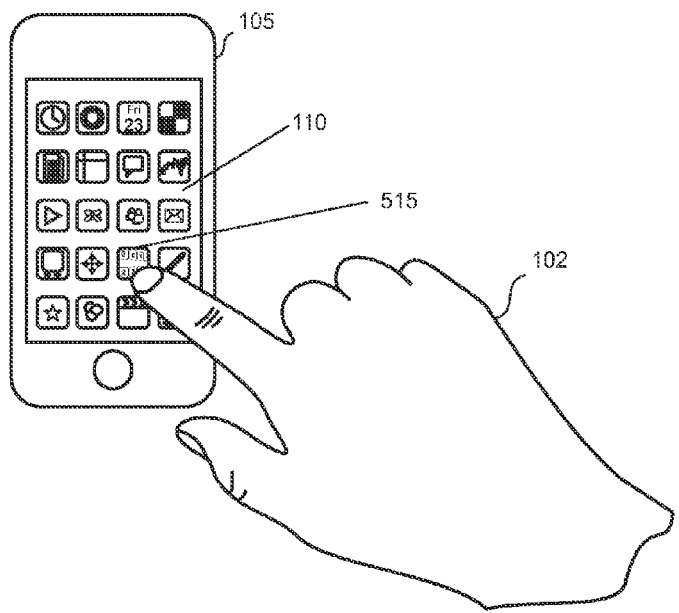
FIG. 9 depicts a user launching the calculator application on an electronic device.
Figure 10:
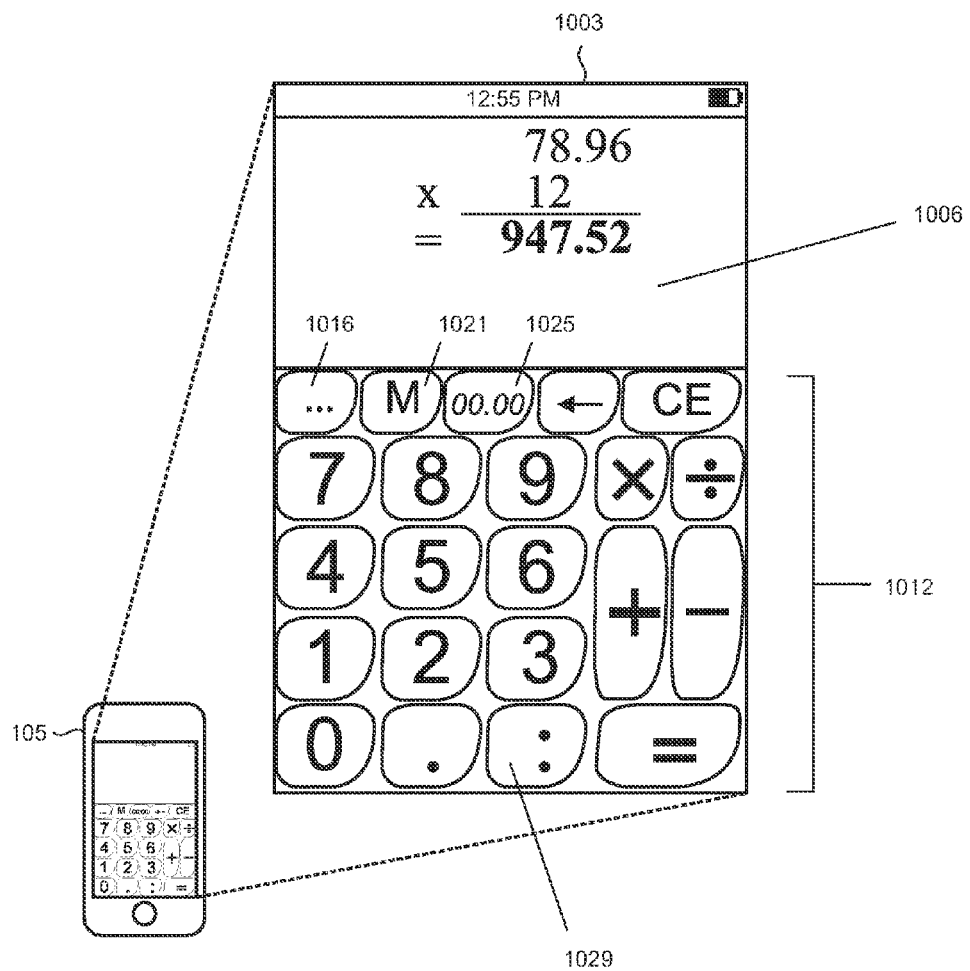
FIG. 10 depicts an illustrative user interface that may be provided by the calculator application including a main calculator window.

FIG. 9 shows the user 102 launching the calculator application by actuating (i.e., touching) its icon 515 on the touchscreen on the electronic device 105. Upon launch, a main calculator window 1003 is displayed on the touchscreen 110 as shown in FIG. 10. The main calculator window 1003 includes a display area 1006 to show calculations. The window also includes a variety of icons (collectively identified by reference numeral 1012) that represent a numerical keypad, decimal key, backspace key, and mathematic operators (i.e., "+", "−", "×", "÷" and "=") that operate in a conventional manner. Several specialized keys are also included in the icon set 1012 including a function key 1016, memory key 1021, display key 1025, and colon key 1029 which are described in more detail below.

Figure 11:
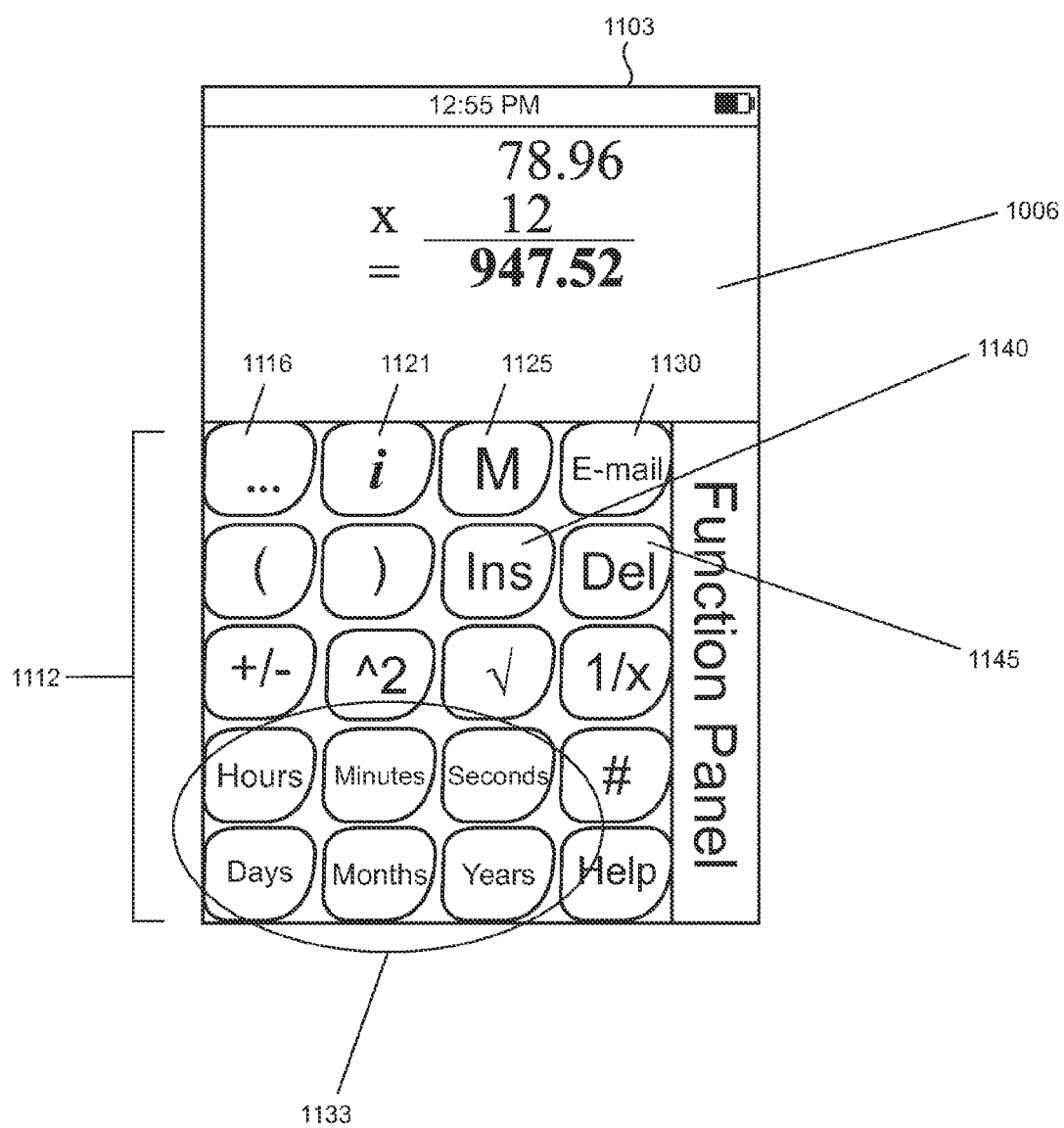
FIG. 11 depicts an illustrative function panel window that may be provided by the calculator application.

When the user 102 actuates the function key 1016, a function panel window 1103, as depicted in FIG. 11, is shown on the touchscreen display 110. The function panel window 1103 includes the display area 1006 to show the same calculations that are shown in the main calculator window 1003 (FIG. 10). The function panel window 1103 also includes a variety of icons (collectively identified by reference numeral 1112) that represent various conventional mathematical functions and operators, such as parentheses for specifying the order of operations, square and square root, sign change (i.e., "+" to "−" and vice versa), and reciprocal. Several specialized keys are also included in the icon set 1112 including a function key 1116 (which when actuated returns the user 102 to the main calculator window 1003), preferences key 1121, memory key 1125 (which functions similarly to the memory key 1021 shown in FIG. 10), e-mail key 1130, time unit keys 1133, an insert key 1140, and a delete key 1145. Each of these specialized keys is described in more detail below.

When the user 102 actuates the preferences key 1121, a preferences window 1203 is shown on the touchscreen display 110. The preferences window 1203 includes various user-selectable options for setting and selecting certain user preferences as to how the calculator application operates. For example, the user 102 can touch a switch icon 1207 to set whether an audible key click is emitted by the electronic device 105 when keys are actuated. Similarly, switches 1210, 1213, 1215, and 1218 may be set by the user 102 to enable or disable particular features as respectively shown in FIG. 12. Thus, turning switch 1210 to the "on" position allows a subtotal to be calculated when a line in the display area 1006 is tapped.

If switch 1213 is "on", then the memories (as described below) may be erased. If switch 1215 is "on", then a warning dialog is displayed to the user 102 prior to memories being erased. If switch 1218 is "on", then a warning dialog is displayed to the user 102 when the colon key 1029 (FIG. 10) is actuated to confirm that the user intends to enter values using a time format. Icon 1221 enables the user 102 to select a preference for the time format that is displayed by the calculator application (as described in more detail below). Icon 1225 enables the user 102 to select a preference for certain memory functionality (as described in more detail below). Icon 1230 enables the user 102 to select a preference for default memory names (as described in more detail below). When button 1233 is actuated, the user 102 is returned to the main calculator window 1003 (FIG. 10).

Figure 14:
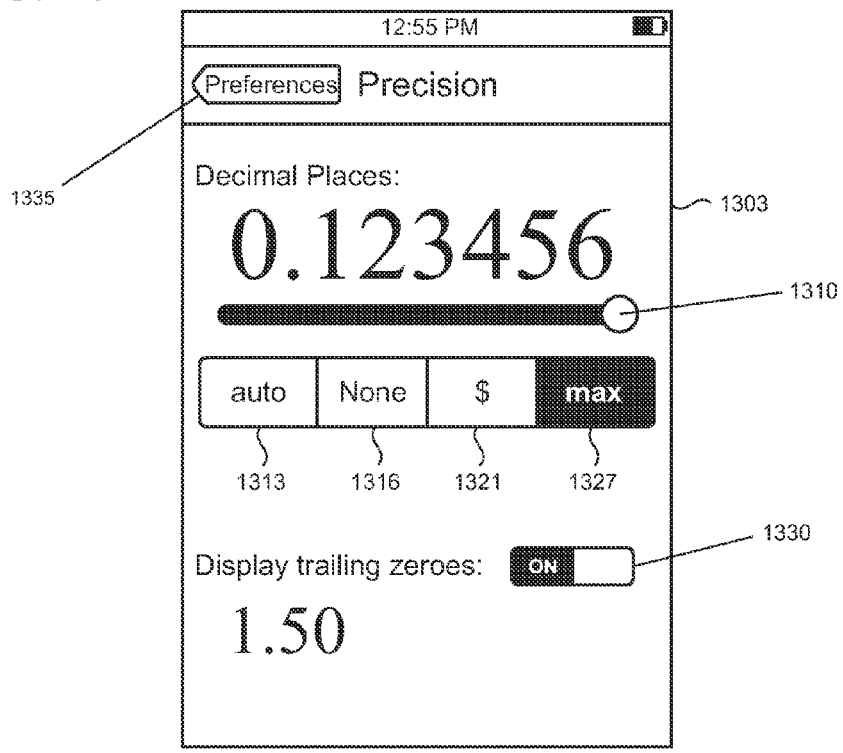

When the arrow button 1238 is actuated, a decimal precision window 1303 is shown on the touchscreen display 110. By interacting with this window, the user 102 may select the number of decimal places that are displayed by the calculator application 515. The user 102 may interact with a slider 1310 to select the desired decimal precision from zero digits past the decimal point to up to six digits past the decimal point. Alternatively, the user 102 may choose from among several presets for decimal precision by actuating the appropriate buttons 1313, 1316, 1321, and 1327 which respectively set the decimal point precision automatically to zero digits (i.e., none), to two digits to represent hundredths in monetary calculations, or to the maximum value of six digits, as shown in FIG. 14. When the decimal precision is set to auto, the calculator application 515 will use as many decimal places as necessary when displaying calculations. The user 102 may select whether trailing zeroes are displayed by the calculator application 515 by toggling switch 1330 to the desired "on" or "off" position. When button 1335 is actuated, the user 102 is returned to the preferences window 1203.

Figure 15:
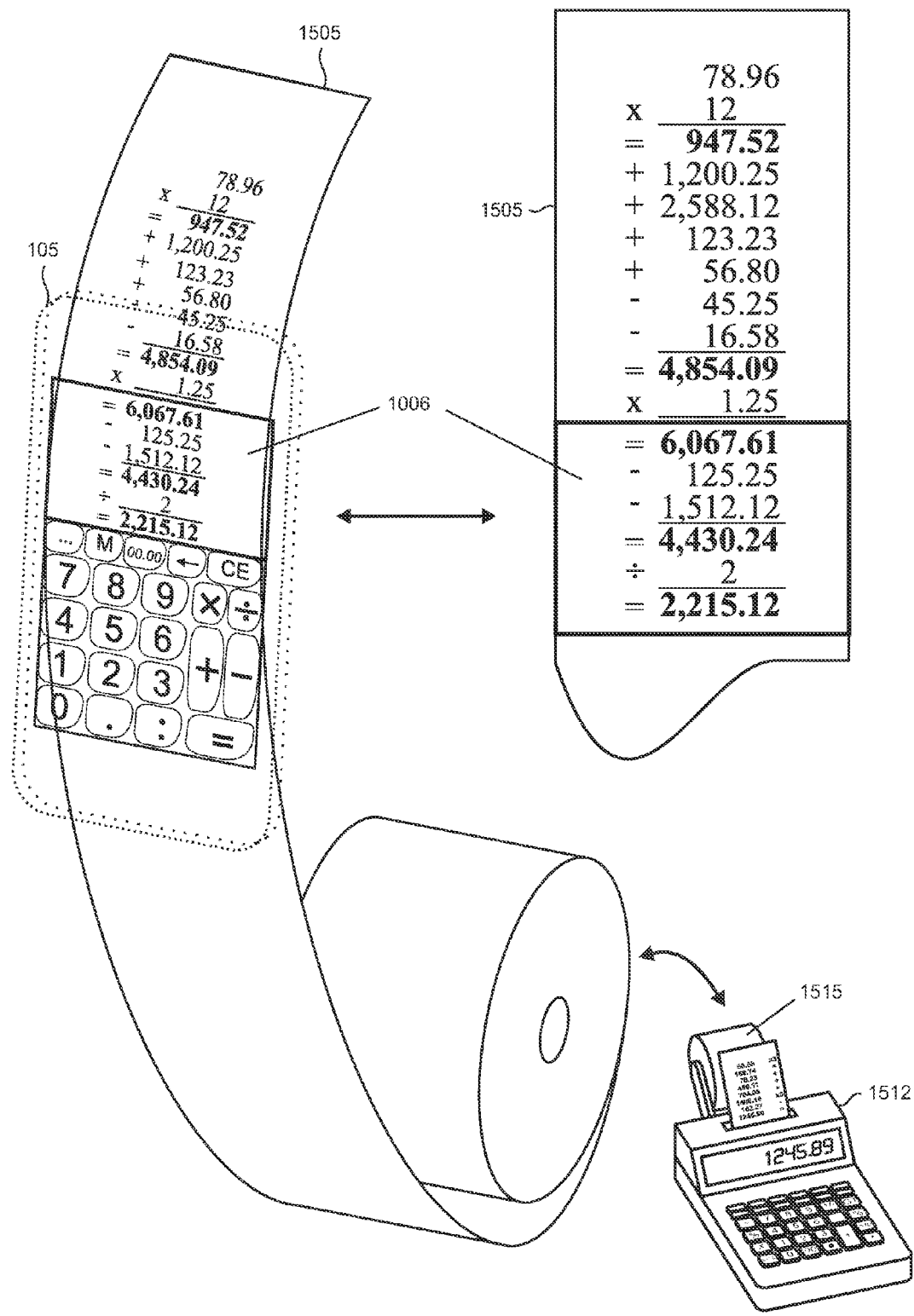
FIG. 15 illustrates how the calculator application supports the use of a virtual tape.

FIG. 15 illustrates how the calculator application 515 supports the use of a "virtual" tape 1505 for displaying calculations as well as organizing calculator application memories. Use of a tape paradigm in the calculator application 515 is intended to replicate the positive user experience that is typically encountered when interacting with a conventional adding machine or printing calculator which utilizes a physical paper tape (as respectively indicated by reference numerals 1512 and 1515). More particularly, a paper tape readily allows a user to see a chain of calculations and ensure that all of the values and operators were correctly entered. Such a visual confirmation can be especially helpful, for example, when a chain of calculations is long and/or complex. It is noted that from this point on in the description that use of the term "tape" means a virtual tape that is supported by the calculator application in accordance with the principles described herein, unless otherwise specified.

The virtual tape 1505 provides all the benefits of visual confirmation of values and operators in a given calculation while adding additional features and functionalities that are difficult or impractical to implement using a conventional paper tape, as described in more detail below. As shown in FIG. 15, the virtual tape 1505 may be visualized as scrolling along the electronic device 105 where a portion of the tape is visible in the display area 1006 at a given instance in time. That is, as the user 102 enters values and operators when performing a calculation, the values and operators are shown in the display area 1006 as if they were printed onto the virtual tape 1505. As more values and operators are entered, the virtual tape 1505 will scroll upwards to enable the latest values and operators to be viewed by the user 102 in the display area 1006 as they are entered.

Figure 16:
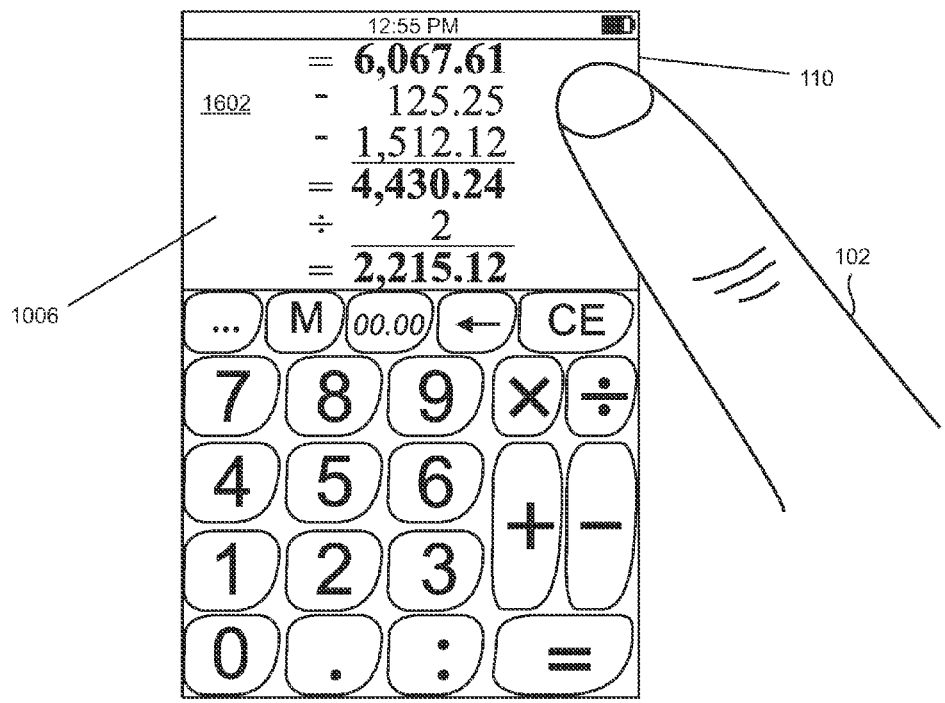
FIGS. 16 and 17 illustrate how a user may scroll through a tape that is displayed in a display area of a main calculator window.
Figure 17:
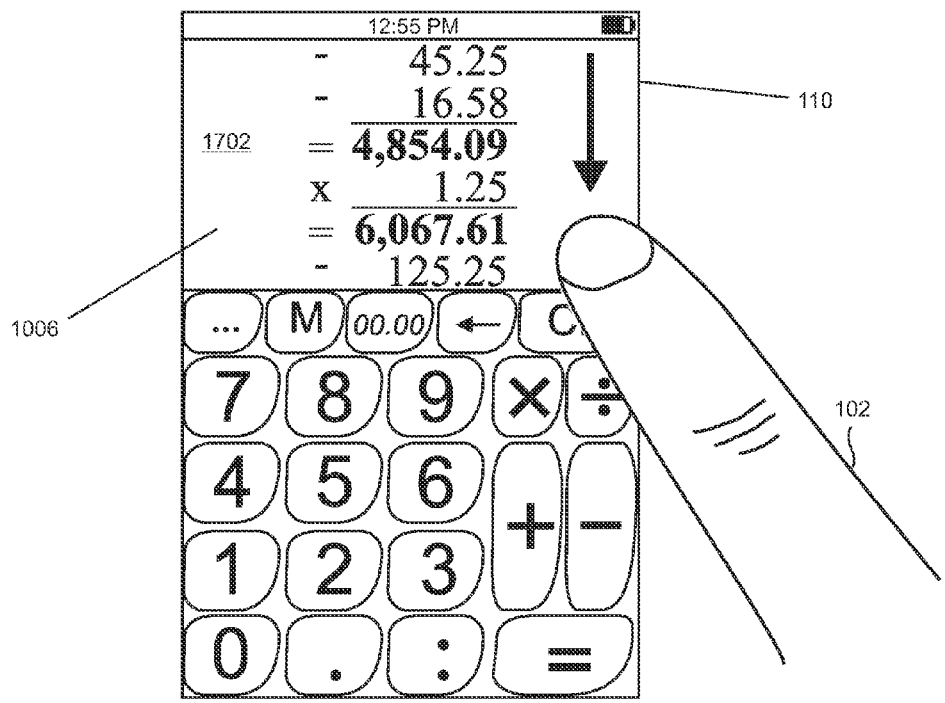

As shown in FIGS. 16 and 17, the calculator application 515 is configured to enable the user 102 to readily view any portion of the virtual tape 1505 by touching a portion of the display area and then dragging the display either upwards or downwards to see the desired tape portion. In this illustrative example, the calculator application 515 may implement gesture-sensitive scrolling so that, for example, the user 102 can use a fast flick of a digit (i.e., finger or thumb) so that the virtual tape 1505 scrolls relatively quickly by, before eventually slowing down and stopping (or by being stopped by the touch of the user 102 at the desired location). Alternatively, a slow drag of the digit across the touchscreen can enable very fine control over the tape's position. Accordingly, as illustratively shown in FIGS. 16 and 17, the user 102 can touch the touchscreen 110 and drag downwards to move the calculation chain from a first position in the display area 1006 (as indicated by reference numeral 1602) to a second position (as indicated by reference numeral 1702 in FIG. 17) to thereby reveal values and operators that are positioned higher on the virtual tape 1505.

Figure 18:
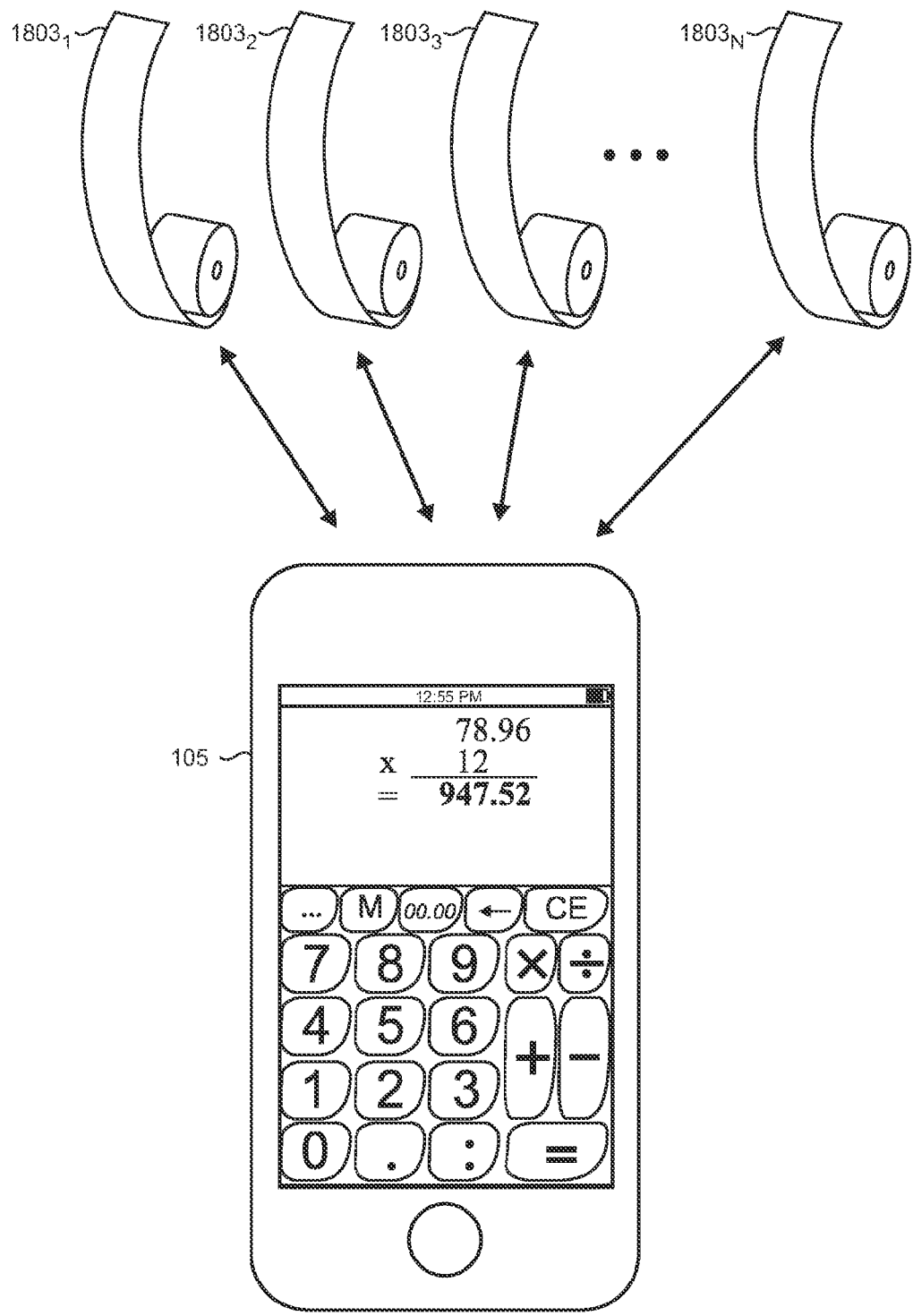
FIG. 18 illustrates how multiple virtual tapes may be supported simultaneously as respective memories that may be accessed by the calculator application.

FIG. 18 illustrates another feature that is provided by the calculator application 515, namely that multiple virtual tapes $1803_{1, 2 \ldots N}$ may be simultaneously supported as memories that can be accessed by the application. That is, memories and tapes are functionally equivalent so that memories may be conceptually regarded as tapes, and tapes as memories. Accordingly, in the description that follows, the terms "tape" and "memory" may be used interchangeably and have the same meaning unless context or an explicit statement is made which indicates the contrary. The multiple tape support feature is shown in FIGS. 19-31 and the accompanying text.

Figure 19:
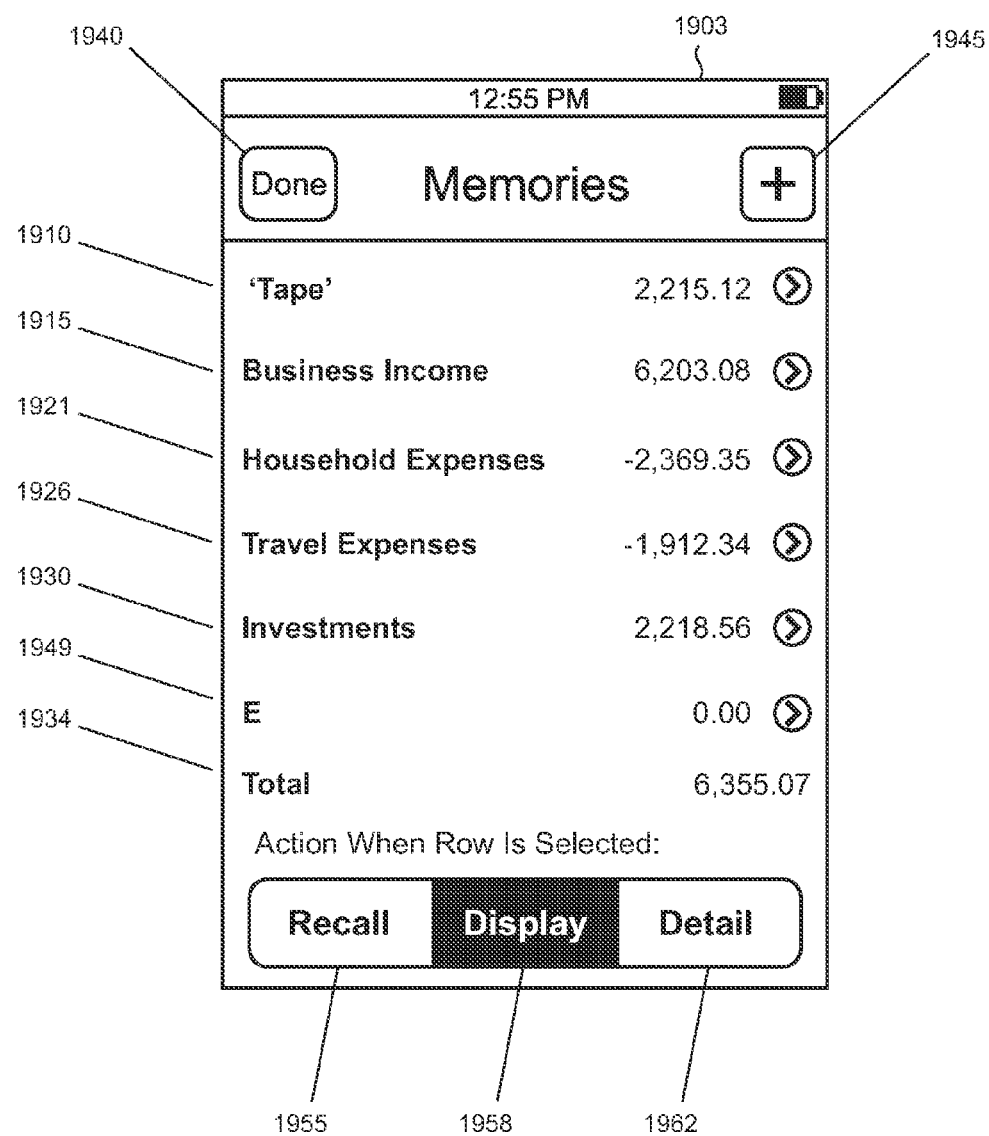
FIG. 19 depicts an illustrative memories window that shows a set of illustrative tapes which are accessible as memories.

FIG. 19 depicts an illustrative memories window 1903 that is shown on the touchscreen display 110 (FIG. 1) when the user 102 actuates the memory key from either the main calculator window 1003 shown in FIG. 10 (key 1021) or from the function panel window 1103 shown in FIG. 11 (key 1125). As shown in FIG. 19, there are five tapes listed in the memories window 1903 which can be selected by the user 102. The listed tapes are named "Tape" (indicated by reference numeral 1910), "Business income" 1915, "Household expenses" 1921, "Travel expenses" 1926, and "Investments" 1930. It is emphasized that these names and the calculations contained therein are arbitrary and intended to be illustrative.

To the right of each of the tape names in the memories window 1903 is the last value on each of respective tapes. Thus, "Tape" has a last value of 2,215.12, "Business income" has a last entry of 6,203.08, and so forth. A mathematical total of all the tape's last values is also shown in the memories window 1903, as indicated by reference numeral 1934. The presentation of the available tapes, the respective last values contained therein, and the mathematical total of the last values in a single window can often be expected to be beneficial to many users. For example, unlike memory recall features that are implemented in many conventional calculators, the user of the present calculator application can see the values in memory prior to recalling, or otherwise using such values.

When button 1940 is actuated, the user 102 is returned to the main calculator window 1003 (FIG. 10). When button 1945 is actuated, a new tape is added to the list. In this example, a taped named "E" (as indicated by reference numeral 1949) has been added (it is noted that memory names start with letters by default according to the preference set by icon 1230 as described in the text accompanying FIG. 12 above).

Figure 20:
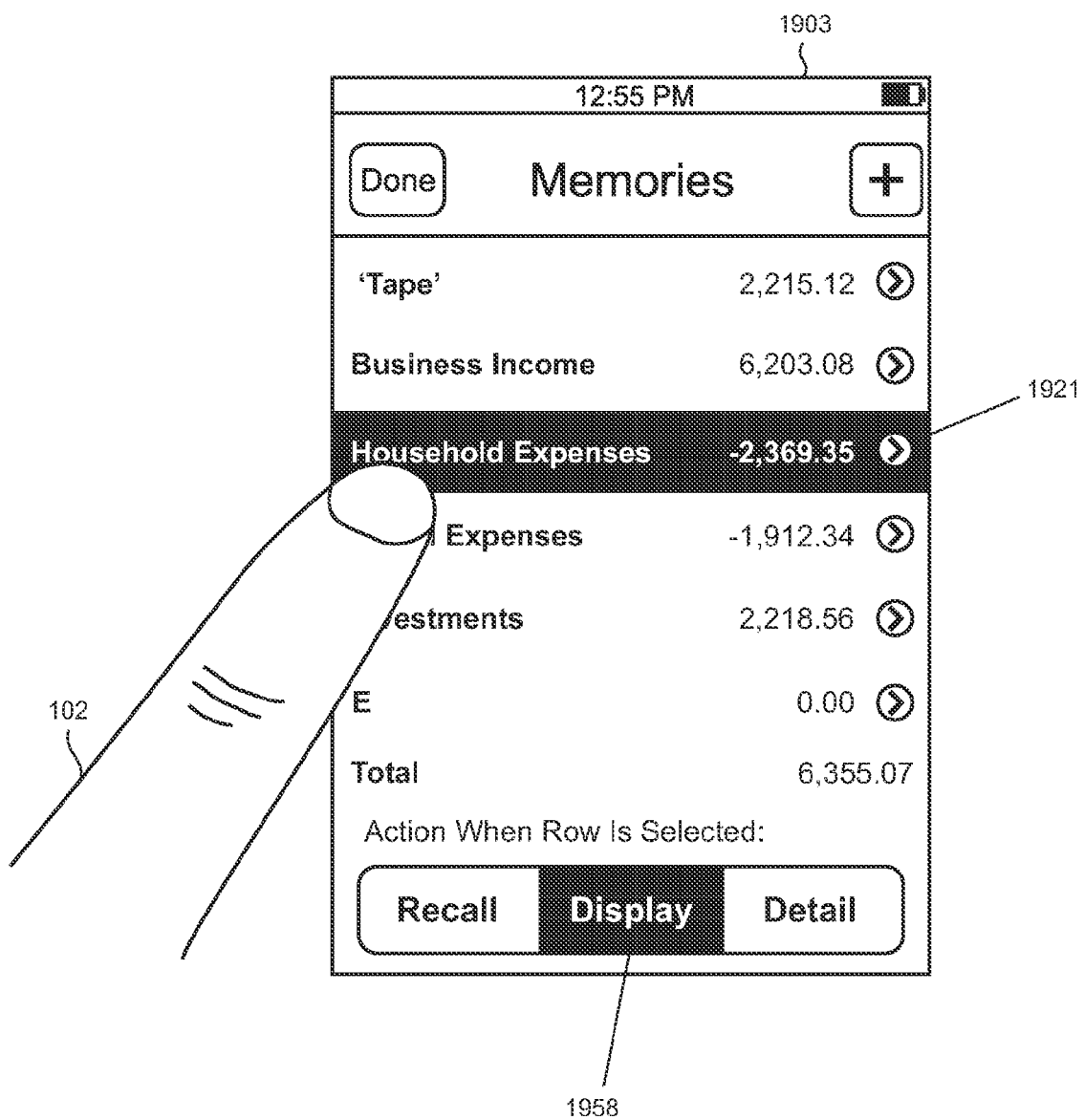
FIG. 20 depicts how a particular tape may be accessed for display from the memories window.
Figure 21:
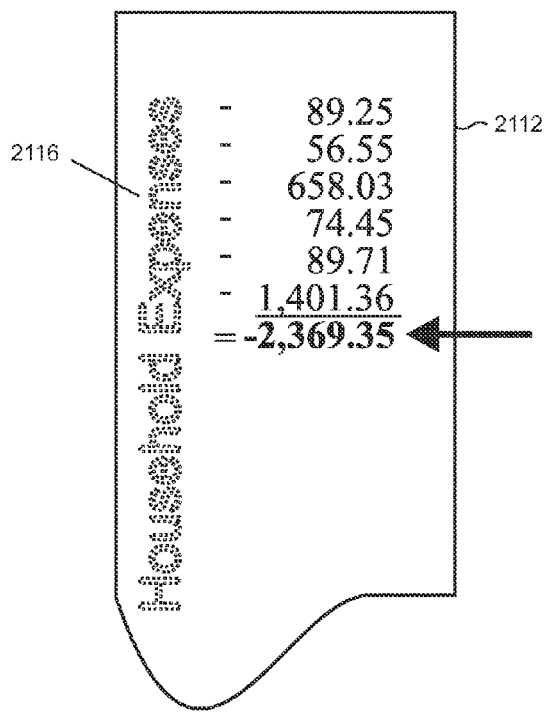
FIGS. 21-24 depict illustrative calculations that are stored in various tapes.
Figure 22:
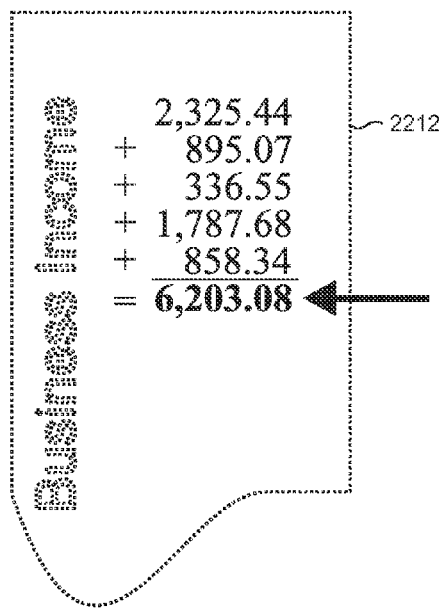
Figure 23:
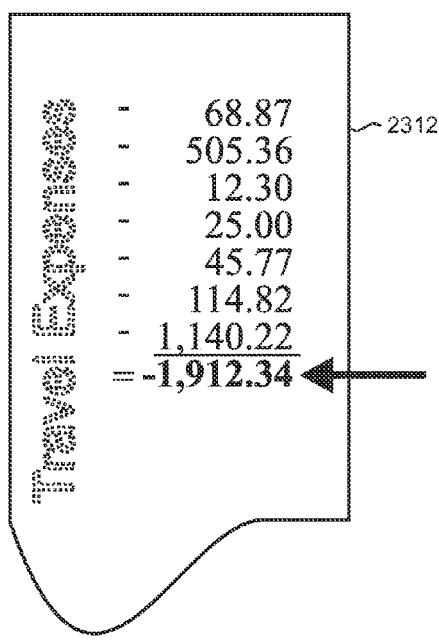
Figure 24:
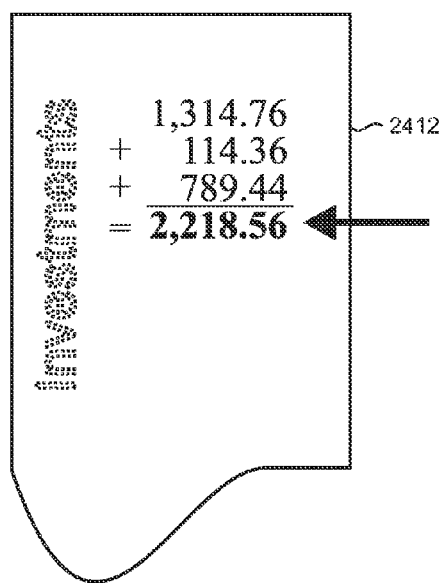

Buttons 1955, 1958, and 1962 enable the user 102 to select the respective actions of recalling, displaying, or showing details about the selected tape. As shown in FIG. 19, the "Display" button 1958 is selected. Accordingly, the "Household expenses" tape listing when selected by the user 102, as shown in FIG. 20, will be displayed. FIG. 21 shows the "Household expenses" tape 2112 in its entirety (recognizing that only a portion of a tape is viewable at a time in the display area 1006). As shown, the tape's name is displayed along the left edge of the tape, typically using a graphic device 2116 that mimics a watermark or other visible, but unobtrusive marking. Similarly, FIGS. 22-24 respectively show the "Business Income" tape 2212, "Travel Expenses" tape 2312, and "Investments" tape 2412. As noted above the last value on each tape (as indicated with an arrow in each FIG) is what is shown on the memories window 1903 (FIG. 19). Typically, the last value on a given tape will be the result of a calculation, but it does not necessarily have to be a calculated result.

Figure 25:
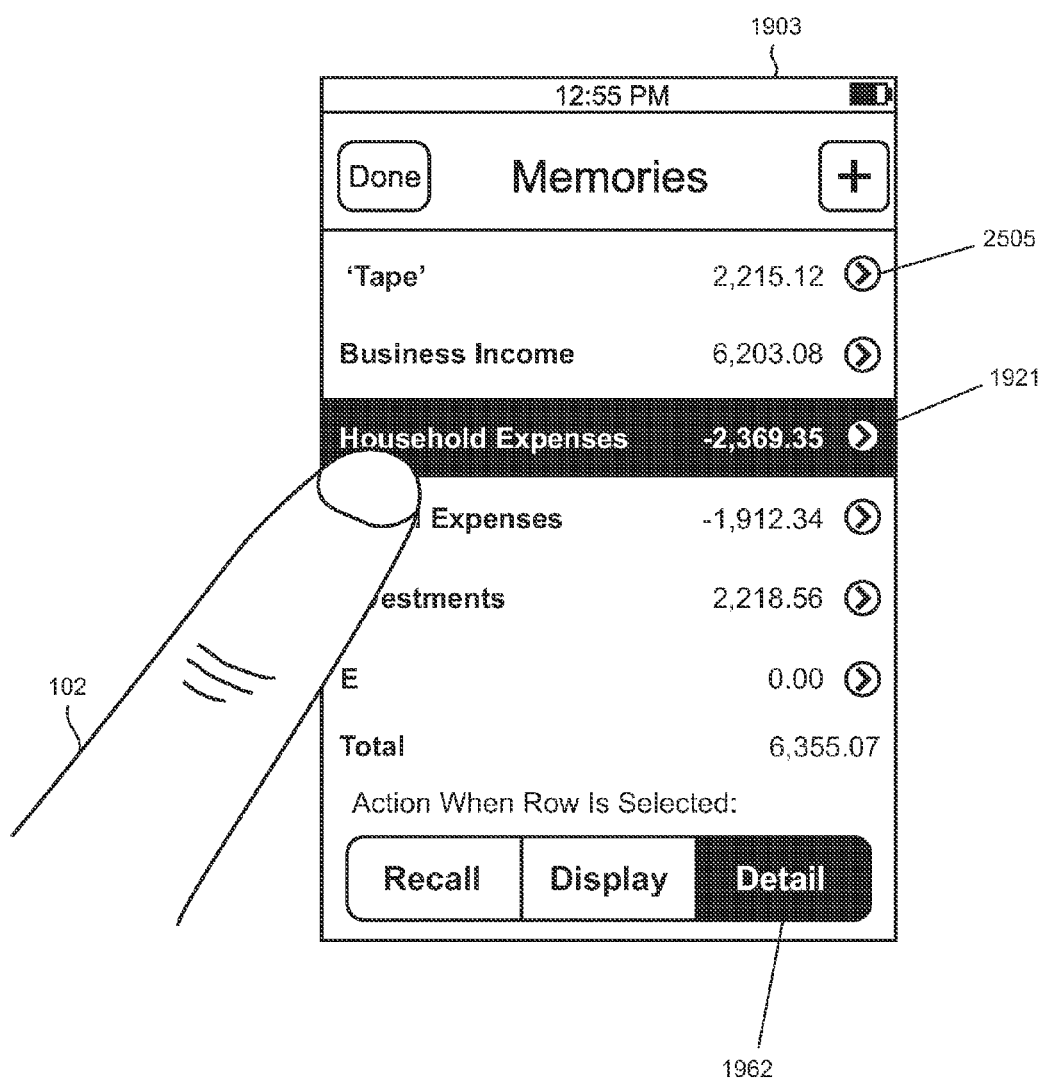
FIG. 25 depicts how details about a particular tape may be accessed from the memories window that may be provided by the calculator application.

FIG. 25 shows the "Detail" button 1962 as being selected. Accordingly, details regarding the "Household Expenses"

tape when selected by the user 102, as shown, will be displayed. Alternatively, details about any given tape may be displayed when the corresponding arrow button on a row is selected (as representatively indicated by reference numeral 2505).

Figure 26:
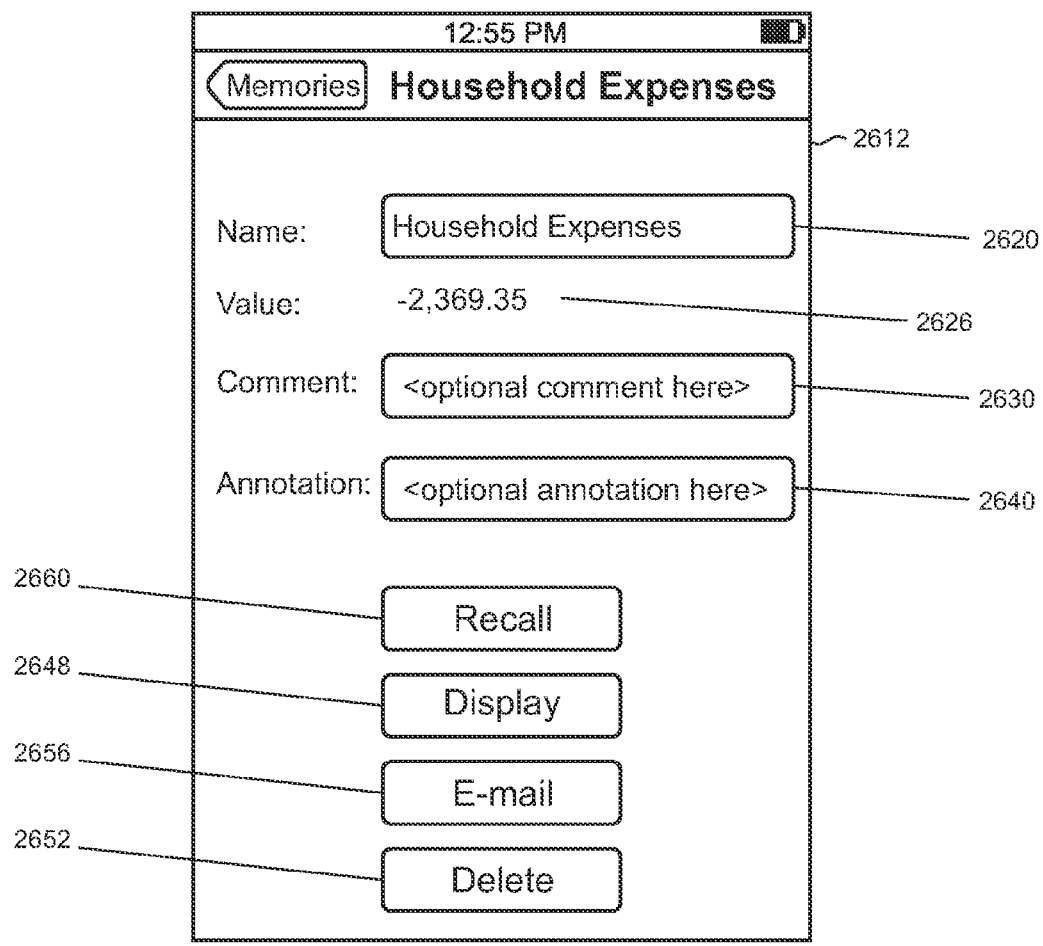
FIG. 26 depicts an illustrative memory details window for an illustrative tape that contains calculations pertaining to household expenses.

FIG. 26 shows a memory details window 2612 that shows details associated with an illustrative tape 2112 (FIG. 21). The name of the tape is displayed in an editable name field 2620. The user 102 may employ the field 2620 to change the tape's name from its default value i.e., a letter or a number depending on the preference selected by the user as discussed above. In this example, the user 102 named the tape "Household Expenses" as shown. The memory's value is indicated by reference numeral 2626. An optional comment for the tape may be entered in editable field 2630 and optional annotations may be entered in editable field 2640.

Figure 27:
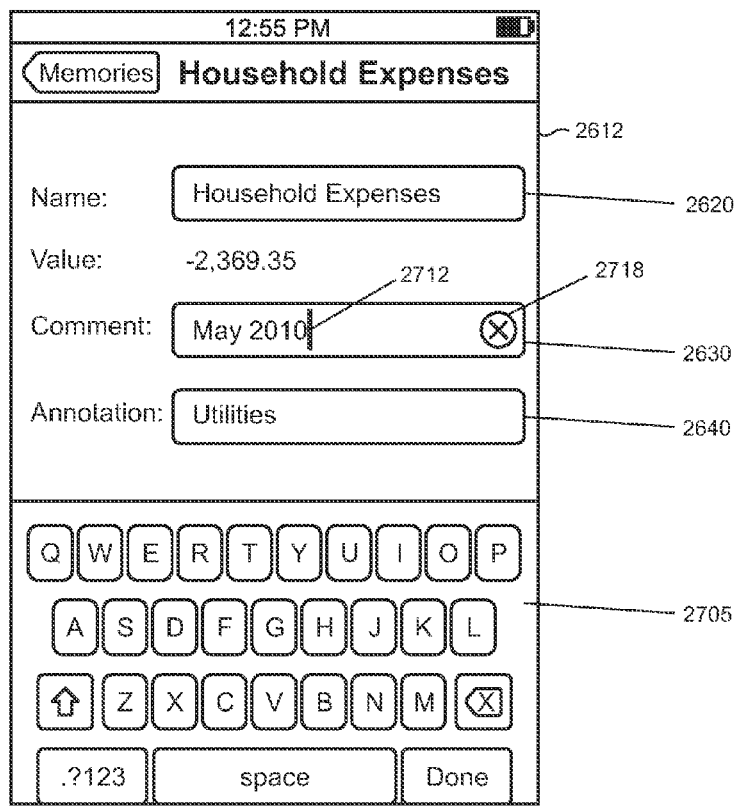
FIG. 27 depicts an illustrative keyboard that is displayed with which a user may enter a name for a tape as well as comments and/or annotations.

When the user 102 touches one of the editable fields (fields 2620, 2630, and 2640, as shown in FIG. 27, a virtual keyboard 2705 is displayed on the touchscreen which enables the user to enter a desired string of characters into a respective field. In this illustrative example, the user 102 is entering the string "May 2010" into the comment field 2630, as indicated by the cursor 2712 which typically is configured to blink. A button 2718 is also provided which clears the field 2630 when actuated by the user 102.

Figure 28:
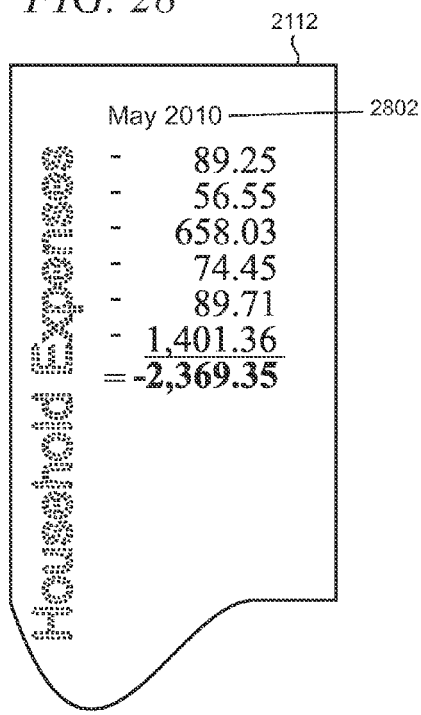
FIG. 28 depicts a tape named "Household Expenses" that includes a comment.
Figure 29:
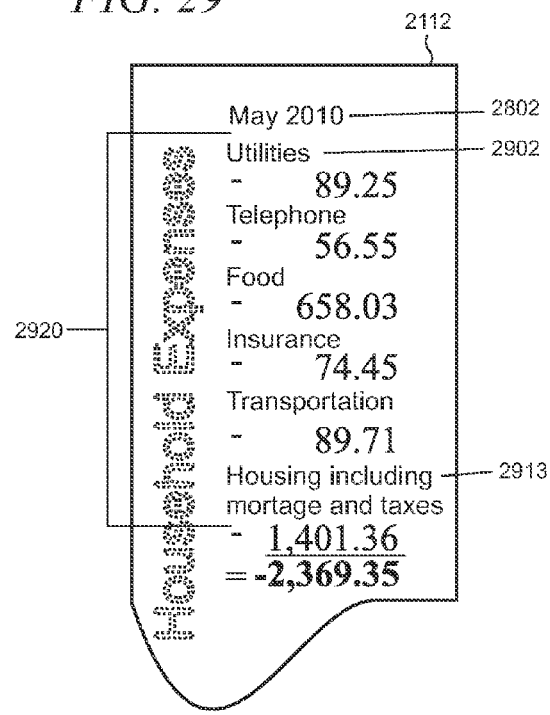
FIG. 29 depicts a tape named "Household Expenses" that includes a comment and annotations.

As shown in FIG. 28, the comment "May 2010" that is entered in the comment field 2630 (FIG. 27) is displayed on the tape 2112, as indicated by reference numeral 2802. While the comment 2630 is located towards the top of the tape 2112 in this example, other locations on the tape may also be used to display the comment depending on the requirements of a particular implementation of the calculator application. As shown in FIG. 29, the annotation "Utilities" that is entered in the annotation field 2640 (FIG. 27) is displayed on the tape 2112, as indicated by the reference numeral 2902 above the first numerical value (i.e., −89.25) at the top of the tape 2112. In some implementations, the annotation feature may operate so that the user 102 can go to memory details window 2612 and use the annotation field 2640 to place an annotation at the current position in any given tape. This capability would enable, for example, use of multi-line annotations (as indicated by reference numeral 2913) as well as line-by-line annotations (i.e., a separate annotation for one or more of the values entered on a tape), as indicated by reference numeral 2920. Alternatively, a separate annotation window could be used (and accessed by the user 102 via an appropriate button on the function panel 1103 shown in FIG. 11 and described in the accompanying text, for example) to generate single or multi-line annotations as may be required to meet the needs of a particular calculator application implementation. It is further noted that annotations can be positioned at different and varying locations on a tape by implementation. Thus, for example, in some implementations the annotation may precede a value on the tape, while in other implementations it may be placed next to a value, or following the value (or combinations of placement positions may be utilized).

Figure 12:
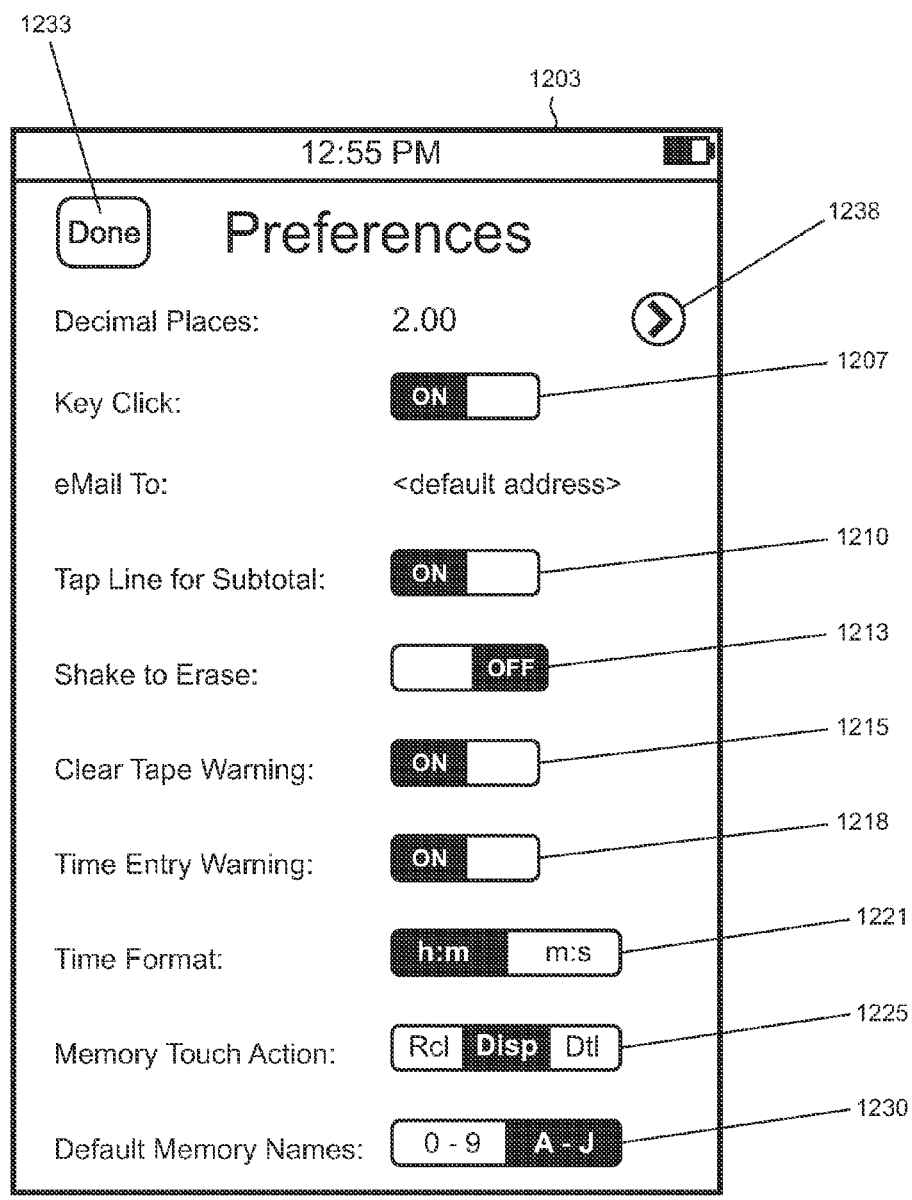
FIG. 12 depicts an illustrative preferences window that may be provided by the calculator application.
Figure 13:
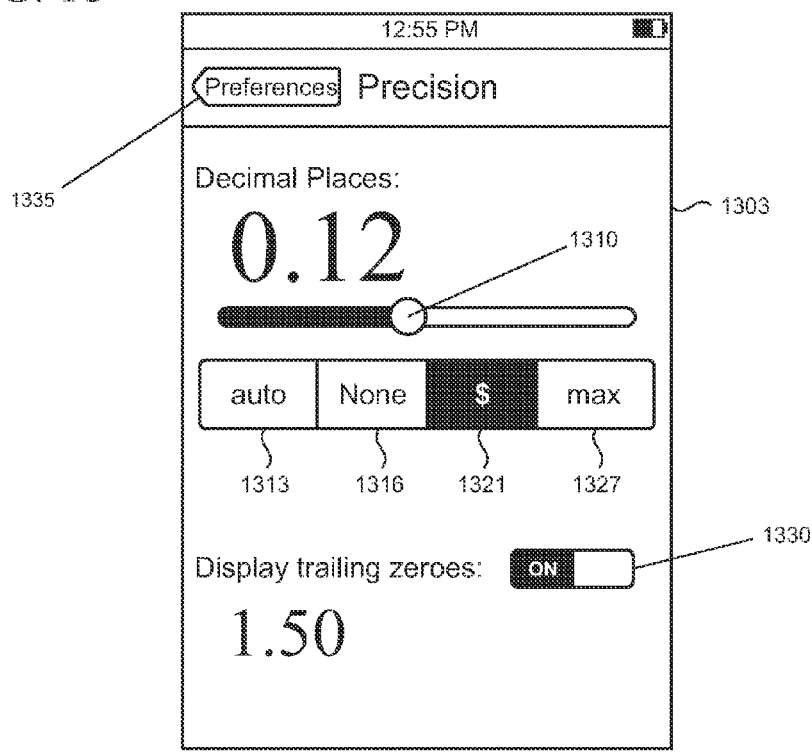
FIGS. 13 and 14 depict an illustrative decimal precision window that may be provided by the calculator application.

Returning to FIG. 26, the memory details window 2612 includes a display button 2648, delete button 2652, e-mail button 2656, and recall button 2660. If the user actuates the display button 2648, the tape associated with the memory details window (in this example, the Household Expenses tape 2112) will be displayed so that it can be reviewed or edited. When the delete button 2652 is actuated, the tape associated with memory details window 2612 will be cleared (i.e., erased). If the warning switch 1215 is set to "on" (as shown in FIG. 12 and described in the accompany text), a dialog box will be displayed to the user 102 to confirm that the user wants to erase the tape prior to actually clearing it.

Figure 30:
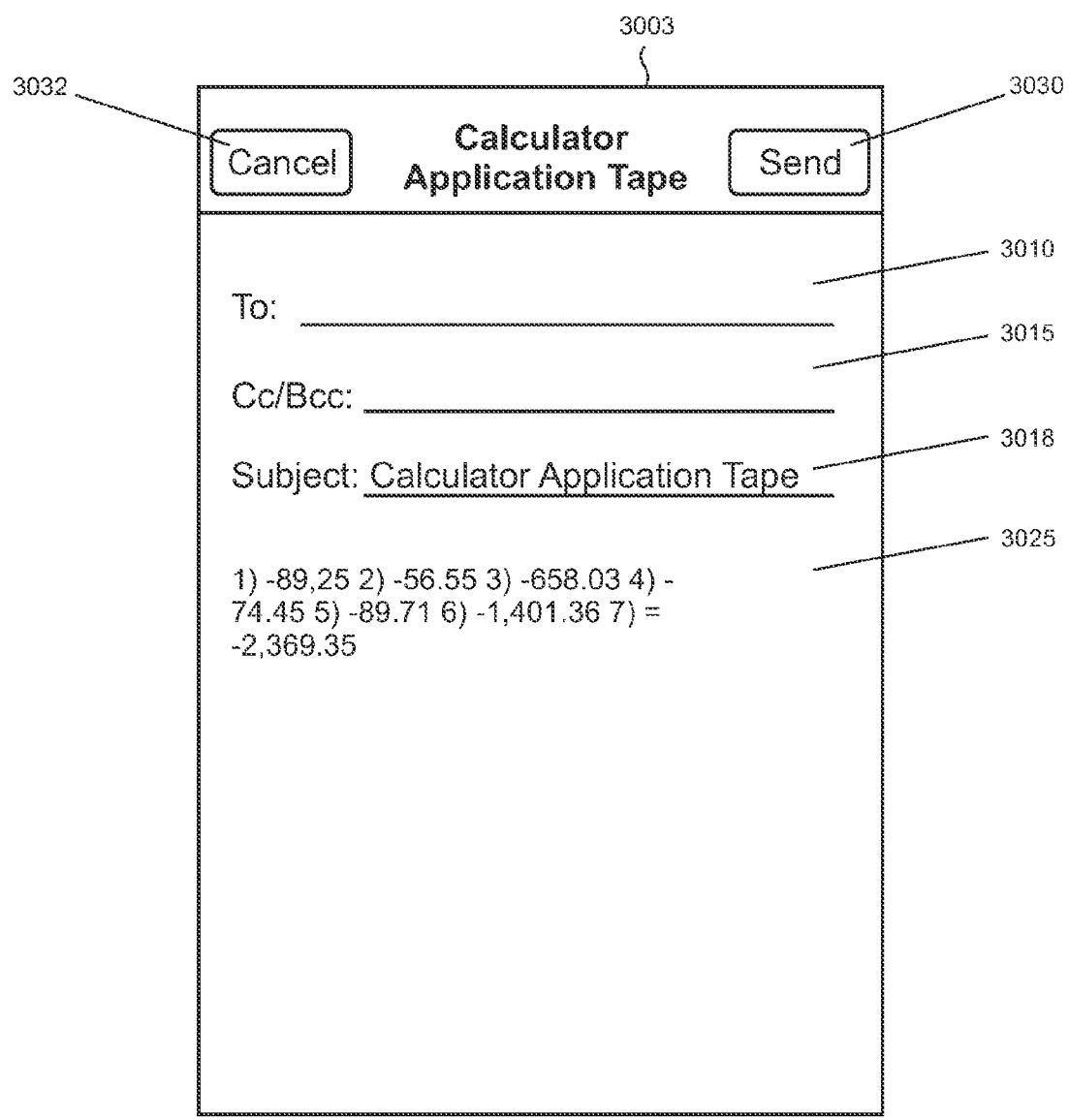
FIG. 30 shows an illustrative e-mail window that may be provided by the calculator application.

When the e-mail button 2656 is actuated, the tape associated with the memory details window 2612 will be placed into a queue for e-mailing. The e-mail queue may be viewed by actuating the e-mail button 1130 in the function panel window 1103 (FIG. 11). As shown in FIG. 30, an e-mail window 3003 is then displayed on the touchscreen display. The e-mail window 3003 provides commonly utilized editable "To:" and "Cc/Bcc:" text entry lines, respectively indicated by reference numerals 3010 and 3015, as well as a default subject in the "Subject:" line 3018. In some implementations, the user 102 may be provided with a facility to pick from among e-mail contacts that are stored in a contacts list or mail application that may be running on the electronic device that hosts the calculator application. Typically, such contacts or e-mail applications expose APIs (application programming interfaces) or other facilities to enable such functionality to be implemented by other applications.

The calculator application automatically populates the body of the e-mail 3025 with the values and operators as they appear on the tape (in this example, the Household Expenses tape 2112). Line numbers are also included in the e-mail 3025 to indicate the positions of the values on the tape. The user 102 can send the e-mail or cancel it using the respective send button 3030 or cancel button 3032. If the e-mail is sent, then the calculator application will generally interface with a mail application that is operable on the electronic device and hand off the e-mail to the mail application for delivery using its functionalities.

Figure 31:
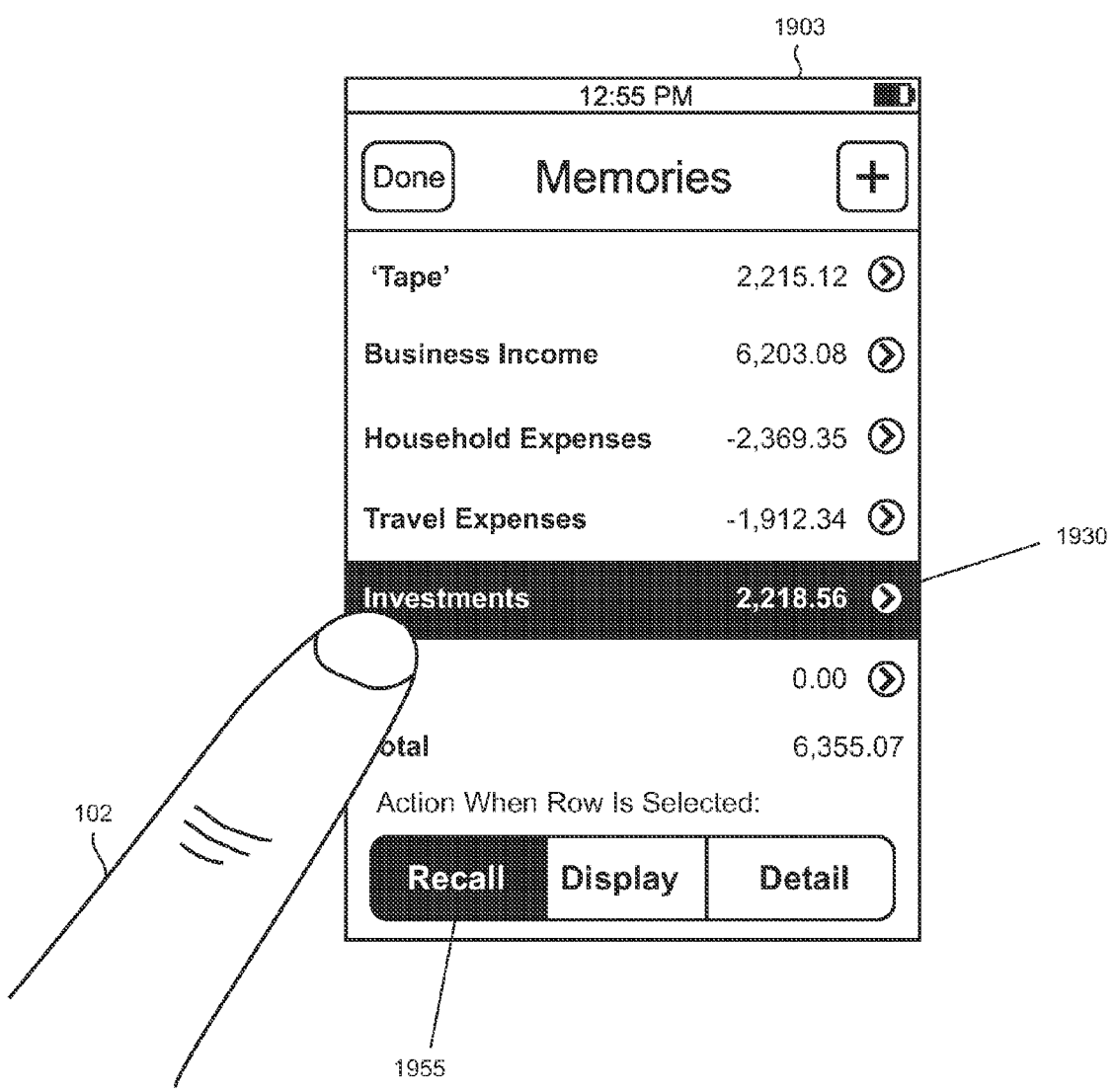
FIG. 31 depicts how a memory value (e.g., the last value on a tape) may be recalled using the memories window that may be provided by the calculator application.
Figure 32:
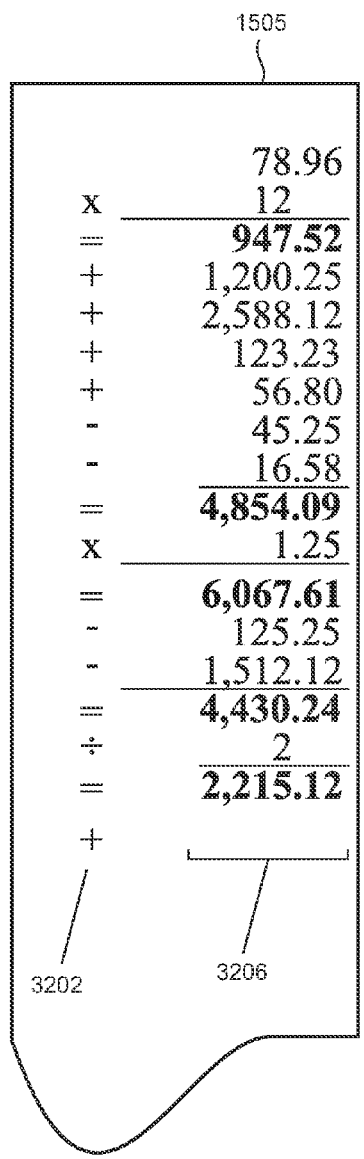
FIG. 32 depicts a tape prior to a recalled value being displayed.
Figure 33:
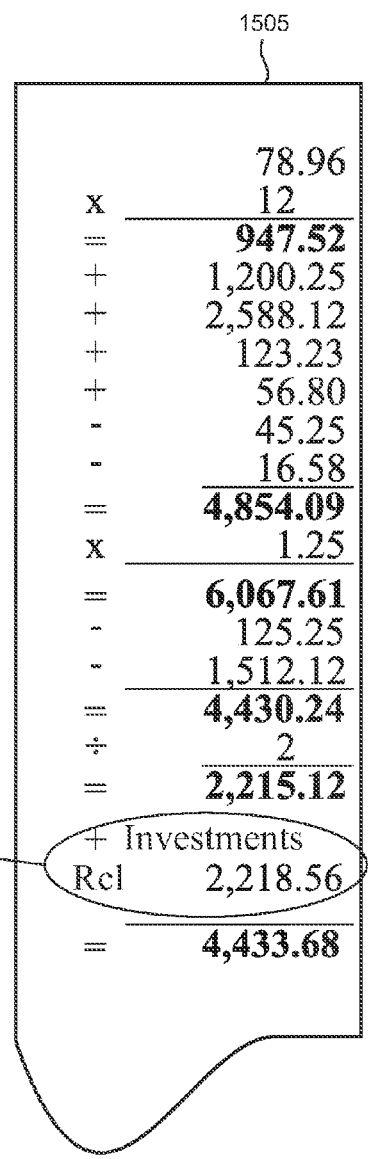
FIG. 33 depicts a tape after a recalled value is displayed.

Returning again to FIG. 26, the recall button 2660 operates to recall the last value on a tape as a memory which can be placed at the current position on another tape. The memory recall function may also be invoked by the user 102 using button 1955 in the memories window 1903, as shown in FIG. 31, to specify the recall action when a tape is selected. In this illustrative example, the user 102 has selected the Investments tape 1930, as indicated by the highlighting, which has a memory value of 2,218.56 (i.e., the last value on that tape). As shown in FIG. 32, the user 102 is performing a chain of calculations on the tape 1505 (FIG. 15) and has entered the "+" operator 3202 at the current line 3206. The user 102 may recall the Investments tape value as a memory using the recall button 1955 from the memories window 1903 as shown in FIG. 31 (or the recall button 2660 from the memory details window 2612 shown in FIG. 26). When recalled, the calculator application inserts the memory value from the Investment tape into the current position on the tape 1505, as shown in FIG. 33 as indicated by reference numeral 3306. A text reference may also be included ("Investments Rcl" in this example) to indicate the source of the recalled memory on the tape 1505. After recalling a value, the user 102 is free to make additional entries or perform other calculations. In this example, the user has entered the "=" operator to arrive at the last value of "4,433.68" on the tape.

Figure 34:
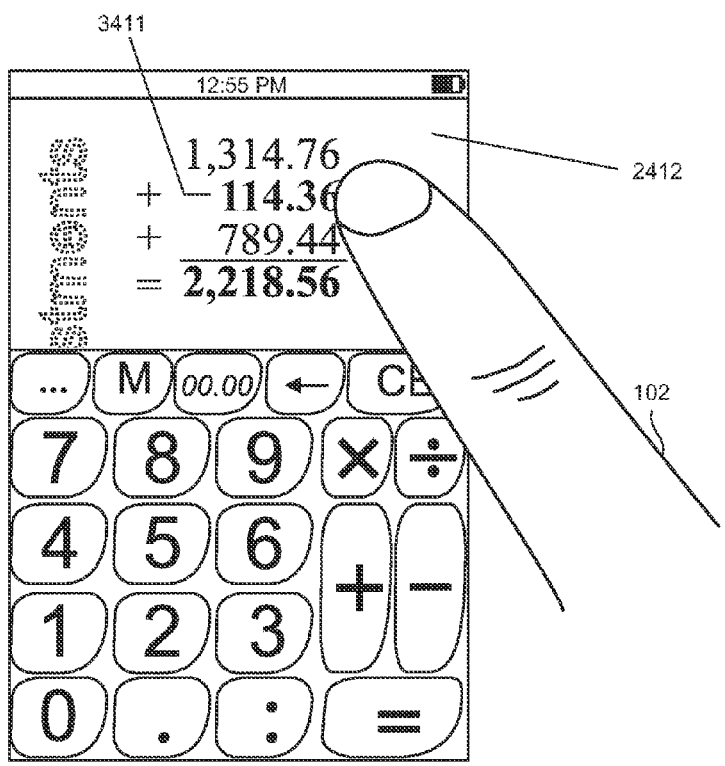
FIGS. 34 and 35 show how a value on a tape may be edited.
Figure 35:
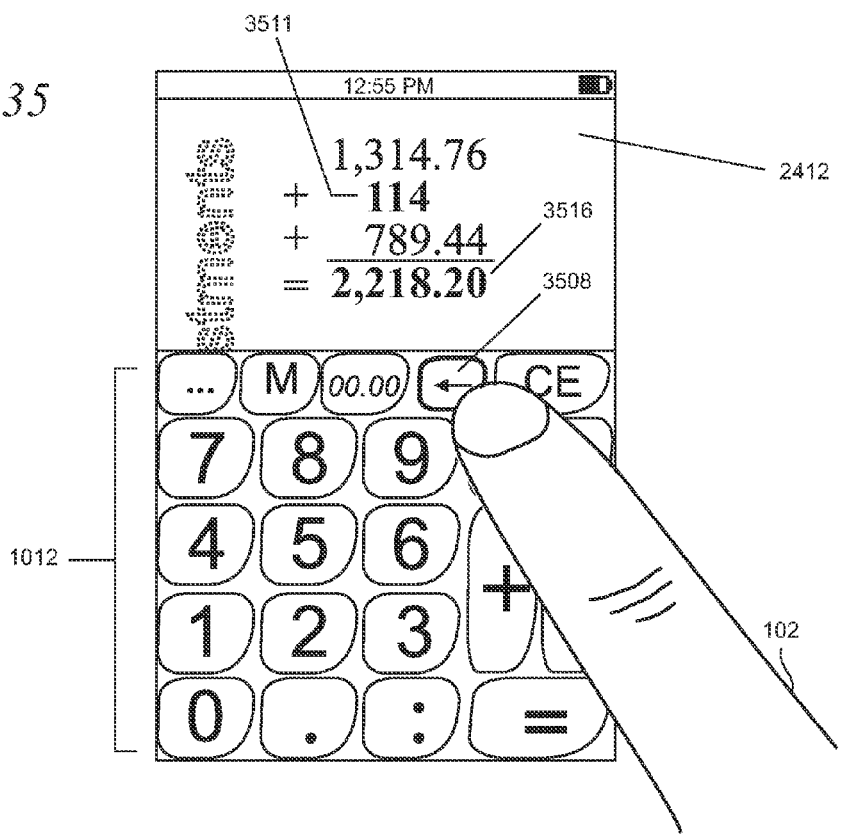

Another feature of the calculator application is to provide the capability to edit entries on any of the tapes 1803 (FIG. 18). For example, as shown in FIG. 34 the user 102 may edit a tape by touching an entry 3411 (in this example, a value on the Investments tape 2412) to highlight it. When highlighted, the user 102 can use the backspace key 3508 shown in FIG. 35 to delete digits in the entry and then use the keypad 1012 to key in the new digits. The calculator application updates all the calculations on the fly as the user 102 makes each edit. Such feature is termed here as "live edits." In this illustrative example, as shown in FIG. 35, the user 102 has deleted the two digits after the decimal point in the entry 3511 which is reflected in the new calculated total (as indicated by reference numeral 3516).

Figure 36:
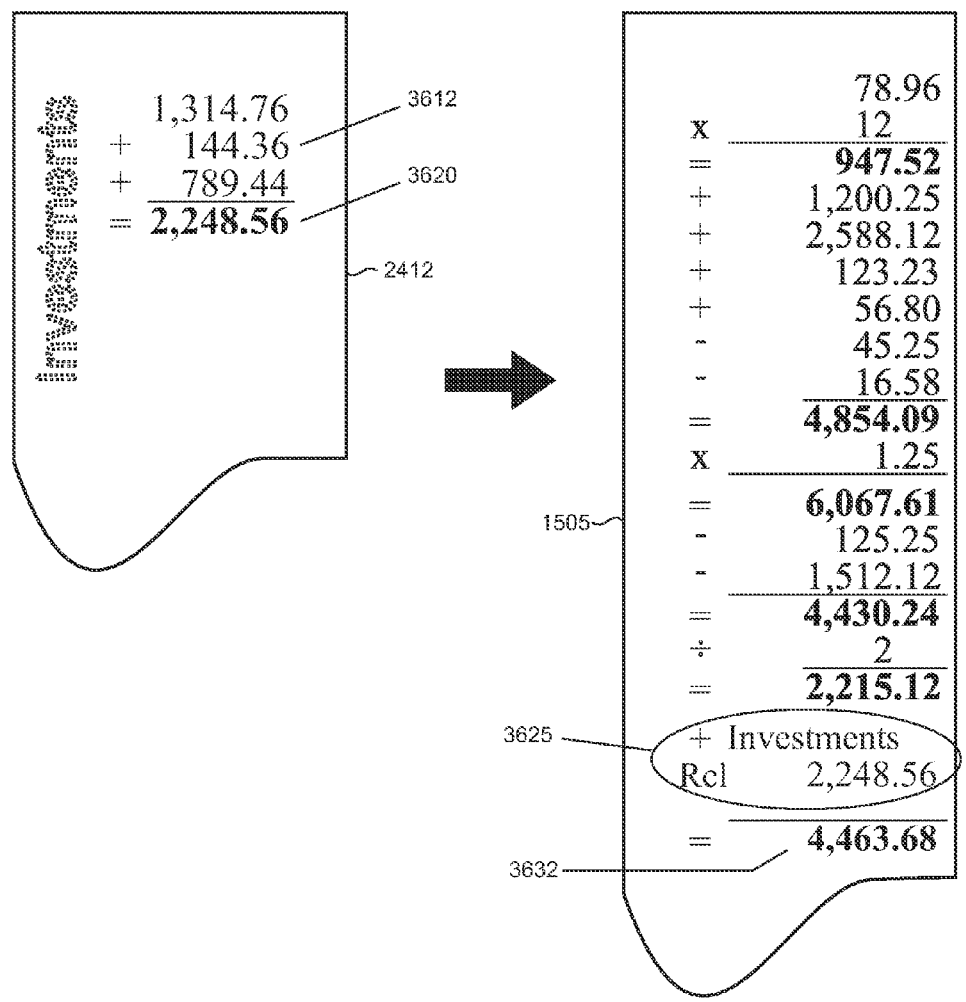
FIG. 36 depicts an illustrative tape which shows how an edited value is reflected in subsequent calculations on a given tape and how an edited value is reflected in another tape that relies on the given tape as a memory.

As shown in FIG. 36, the user 102 has edited the entry so that it is now shown on the Investments tape as "144.36" (as indicated by reference numeral 3612). The calculator application calculates the new total as "2,248.56" (as indicated by reference numeral 3620). In addition, the calculator application will recalculate any tape that is affected by the user's edit. For example, as tape 1505 uses the Investments tape 2412 as a memory, the calculator application will show the new Investments tape total in the appropriate location on the tape 1505, as indicated by reference numeral 3625 and recalculates a new total "4,463.68" (as indicated by reference numeral 3632).

Figure 37:
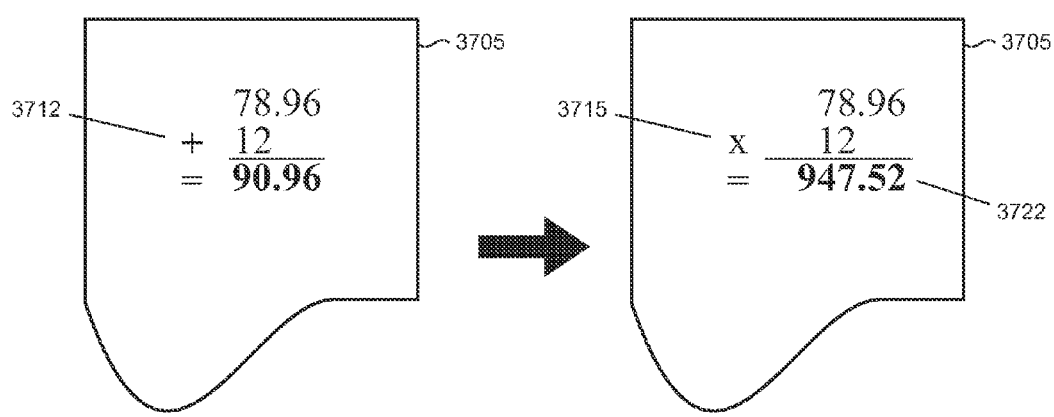
FIG. 37 depicts an illustrative tape which shows that operators may be edited.

In addition to supporting live edits of values, the calculator application enables the user to edit operators as well. For example, as shown in FIG. 37, the operator on a tape 3705 reflects a user's edit from "+" to "×" (as respectively indicated by reference numerals 3712 and 3715). The calculator application recalculates the tape (and any tape that uses the user-edited tape as a memory) and displays the new values resulting from the edited operator, which in this example is a new total, as indicated by reference numeral 3722.

Figure 38:
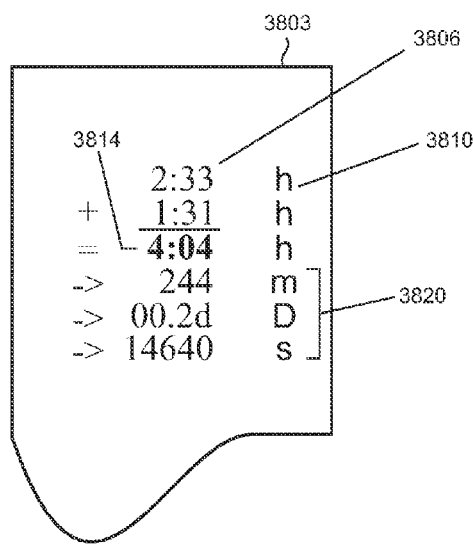
FIG. 38 depicts an illustrative tape which shows how time values may be used for calculations and how time units for a given value can be converted on the tape.

As noted above in the text accompanying FIGS. 11 and 12, the calculator application supports entry of values and calculations using units of time through use of the colon key 1029 (FIG. 10). For example as shown in FIG. 38 the first value (indicated by reference numeral 3806) on tape 3803 is entered as "2:33" which, according to the user preference for time units set in the preferences window 1203 (FIG. 12), means two hours and thirty-three minutes. A time indicator "h" (indicated by reference numeral 3810) is displayed on the tape 3803 to affirmatively visually confirm the time units. FIG. 38 further shows that a second time value of "1:31" (one hour and thirty one minutes) is being added to the first and that the total (indicated by reference numeral 3814) properly shows the sum as being "4:04" (four hours and four minutes).

The calculator application enables values to be converted from one time unit to another (e.g., hours, minutes, seconds, days, months, years) using time unit keys 1133 in the function panel window shown in FIG. 11. Accordingly, as shown in FIG. 38, the user 102 has converted the sum of four hours and four minutes to corresponding values using various other time units, as indicated by reference numeral 3820. Time indicators (e.g., "m", "D", "s" for minutes, days, and seconds) are displayed next to the values on the tape 3803 to provide a confirmation of the time units being used.

Figure 39:
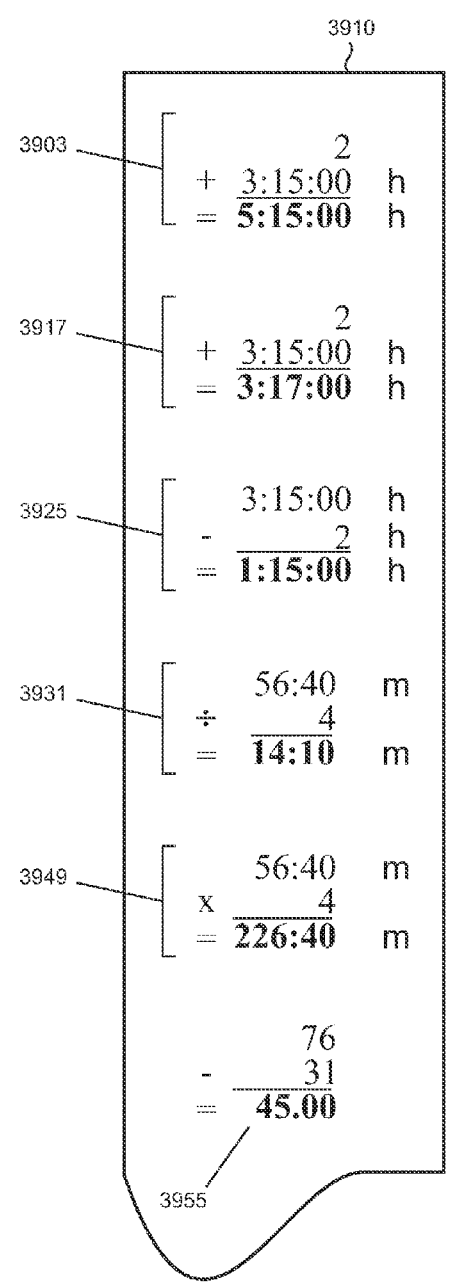
FIG. 39 depicts an illustrative tape which shows how different time unit preferences can affect a calculation and how multiple calculations may be shown on a given tape.

The user's selected preference for time in the time preferences window 1203 (FIG. 12) enables the calculator application to interpret raw (i.e., unitless) values according to the selected preference when performing time-based calculations. For example, as shown in FIG. 39, the calculator application will interpret the "2" in the first calculation 3903 on the tape 3910 to be in units of hours if the time preference is set for hours and minutes. Accordingly, the calculation comprises the addition of two hours to the value of three hours and fifteen minutes to result in the sum of five hours and fifteen minutes. By contrast, if the user sets the time preference for minutes and seconds in the preferences window 1203, then the calculator application will interpret the "2" to be in units of minutes. This is shown in the second calculation 3917 on the tape 3910 where the calculation comprises the addition of two minutes to the value of three hours and fifteen minutes to result in the sum of three hours and seventeen minutes.

In addition to being added, time values can be subtracted and multiplied or divided by non-time values as respectively shown in calculations 3925, 3931, and 3949 on the tape 3910. Tape 3910 further depicts how multiple calculations (both time-based and non-time-based) may be supported on a single tape. As noted above, the last value on the tape is used as the tape's memory value, which in this example is "45.00" as indicated by reference numeral 3955.

Figure 40:
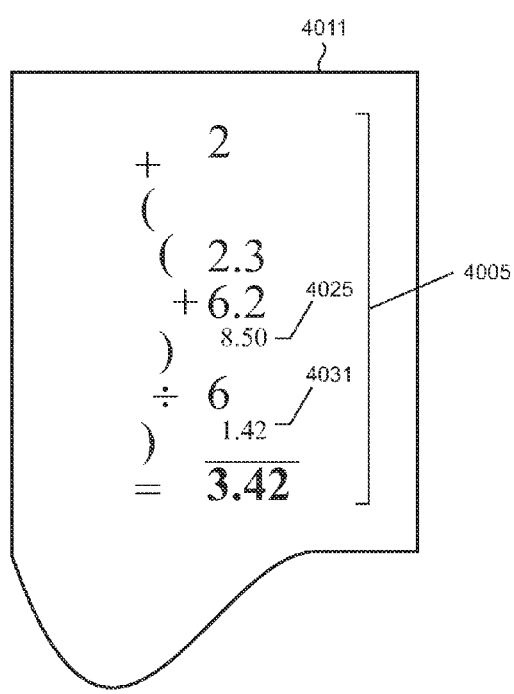
FIG. 40 depicts an illustrative tape which shows how parentheses are indented to show the level of embedding within a calculation.

FIG. 40 highlights other features supported by the calculator application. In particular, parentheses are displayed using various indents to indicate the level of nesting within a given calculation. The calculation 4005 shown on tape 4011 is 2+((2.3+6.2)÷6)=3.42 which includes two parenthetical expressions with one nested within the other. The calculator application evaluates the inner parenthetical expression by adding the values 2.3 and 6.2 which results in 8.50. This intermediate result (8.50) is displayed by the calculator application on the tape 4011 as indicated by reference numeral 4025. The outer parenthetical expression is then evaluated by dividing the result of the inner parenthetical expression by 6. This result (1.42) is displayed by the calculator application on the tape 4011, as indicated by reference numeral 4031, to which 2 is added to result in a calculated value of 3.42. Both the indenting feature for nested parenthetical expressions and the display of the intermediate results of the evaluation of the expressions is expected to make using and keeping track of parenthetical expressions easier for the user. Parentheses may also be live edited (in a similar manner as with values and operators) as an additional feature that is supported by the calculator application.

Figure 41:
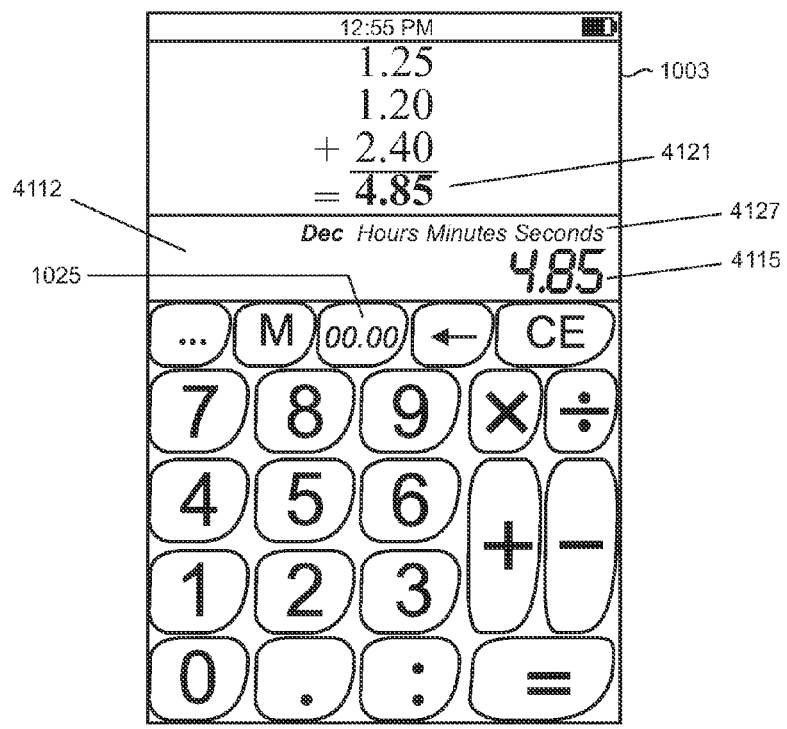
FIG. 41 depicts an illustrative display window that may be displayed as part of the user interface of the calculator application.

FIG. 41 depicts an illustrative display window 4112 that may be displayed as part of the user interface supported by the main calculator window 1003 in the calculator application. The display window 4112 is toggled on and off (i.e., shown and hidden) using the display key 1025. The display window 4112 is configured to function in a similar manner to a conventional single-line calculator display by showing only the current line such as a value the user enters with the keypad or a result that is calculated by the calculator application. Some users may prefer to see and use a more traditional display in some cases, but the display window 4112 can always be hidden if more room is needed to see and work with the tape.

As shown in FIG. 41, the window 4112 displays a number "4.85" (indicated by reference numeral 4115) which matches the current line in the tape (indicated by reference numeral 4121). A unit indicator 4127 is also shown in the display window 4112 to indicate if a displayed number is a regular decimal number or if it represents units of time (and if in time units, whether such units are hours, minutes, or seconds). In this example, the indicator "Dec" is highlighted in the unit indicator 4127 to show that the displayed number is a regular decimal number.

Figure 42:
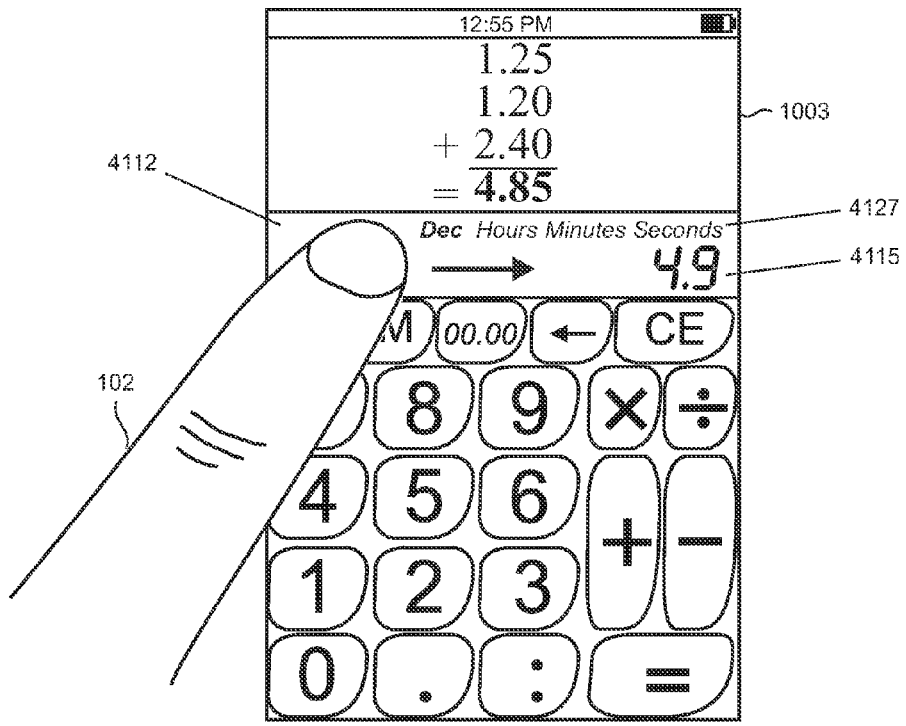
FIGS. 42-44 show how a user may touch the display window and drag to change the decimal precision of the displayed value.
Figure 43:
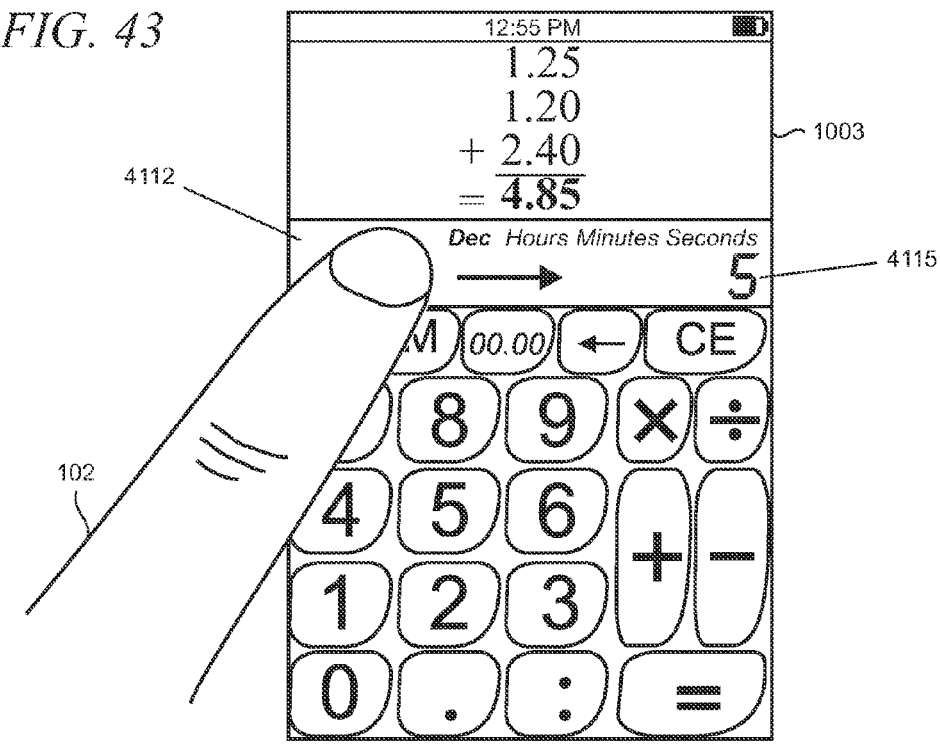
Figure 44:
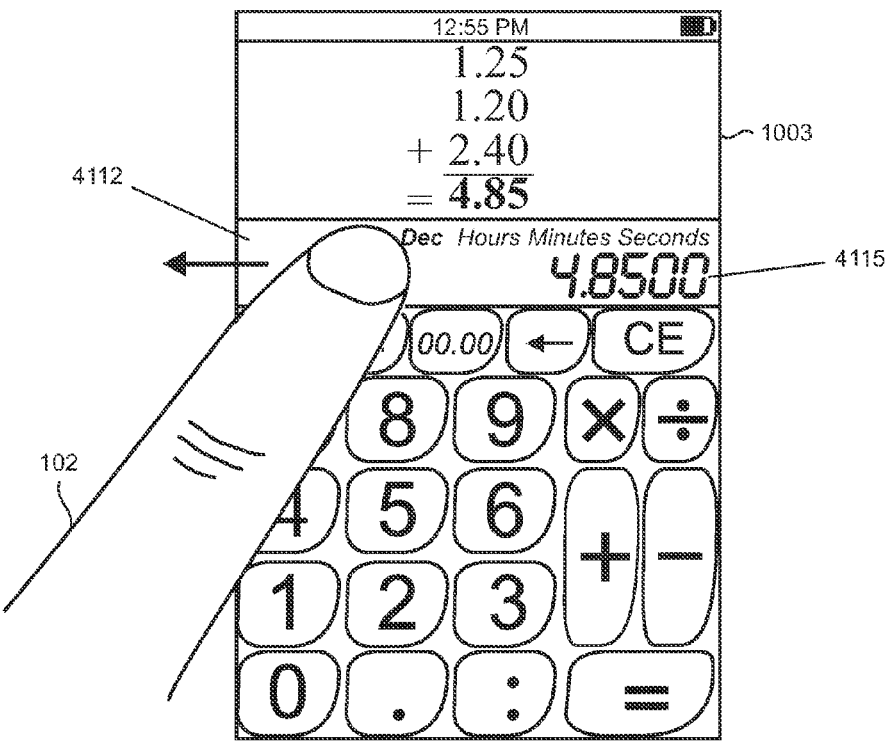

The display window 4112 supports a feature that enables the user 102 to select the number of digits displayed past the decimal by touching the display window 4112 and dragging to the right or left. As shown in FIG. 42, if the user 102 touches the display window 4112 and then drags to the right, the displayed number changes from "4.85" to "4.9." That is, the decimal precision of the displayed number 4115 is changed from two digits to a single digit and the displayed value is rounded up or down as appropriate. As shown in FIG. 43, as the user 102 continues to touch and drag to the right, the displayed number 4115 will show only digits to the left of the decimal. In this example, the displayed number changes from "4.9" to "5." If the user 102 touches the display window and drags to the left, then additional digits past the decimal point will be displayed. As shown in FIG. 44, the user 102 has revealed four digits to the right of the decimal point. If the user 102 continues to touch and drag to left, up to six digits past the decimal point may be displayed in this illustrative implementation of the calculator application.

Figure 45:
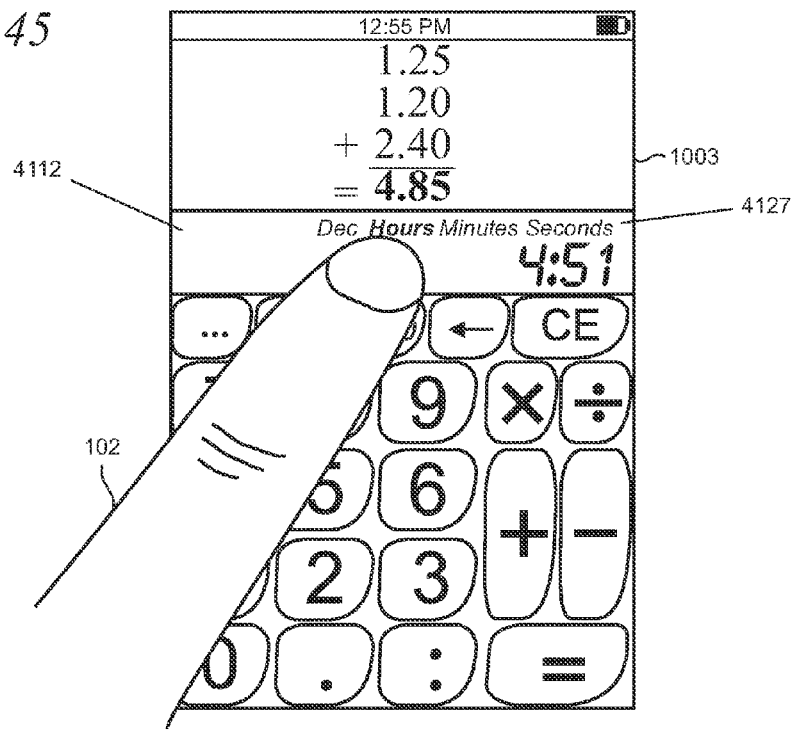
FIGS. 45 and 46 show how a value in the display window may be converted to different units by tapping the unit indicators.
Figure 46:
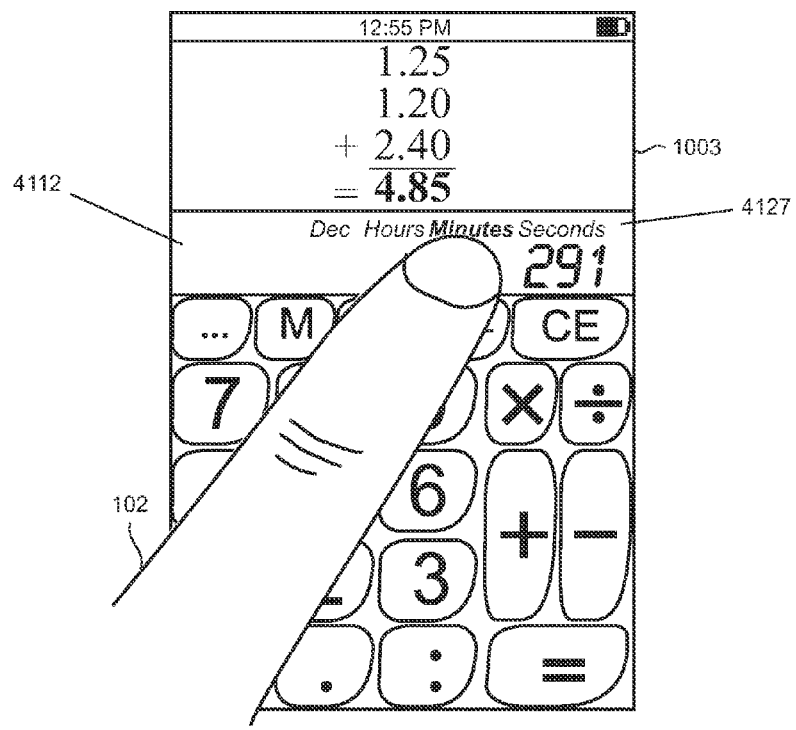

The unit indicator 4127 in the display window 4112 may be utilized to toggle the displayed number between decimal and time units. As shown in FIG. 45, by touching "Hours" in the unit indicator 4127, the displayed number will change to reflect hours and minutes (i.e., 4.85 hours is equivalent to four hours and 51 minutes). By touching other unit indicators, additional conversions may be performed. For example, as shown in FIG. 46, by touching "Minutes" in the unit indicator 4127, the displayed number will change to reflect minutes. In this example, four hours and fifty one minutes is equivalent to 291 minutes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more non-transitory computer-readable media storing instructions which, when executed on an electronic device, implement a calculator application configured for performing a method comprising the steps of:
   receiving a sequence of values and operators which comprise a calculation that are entered by a user on a keypad implemented by the calculator application via a user interface;
   implementing a virtual tape for storing the sequence and being selectively viewable by the user on the user interface to show at least portions of the stored sequence, the virtual tape being arranged as a user-accessible memory so that selected data in the virtual tape is linkable to one or more respective virtual tapes in a plurality of virtual tapes, each of the virtual tapes i) being configured to be selectively viewable by the user for display on the user interface, and ii) including a visible graphic device, the visible graphic device resembling a watermark and providing information to uniquely identify a given virtual tape;
   configuring the user interface for editing the values or the operators in the stored sequence on the virtual tape, the user interface being adapted for implementing a calculator time mode, the calculator time mode enabling accepting values having units of time, displaying the values having units of time, performing calculations using the values having units of time, and displaying results of the calculations using the units of time, the user interface including a user control for invoking the time mode, the user control being graphically identified using a colon displayed on the user interface;
   dynamically updating the calculation responsively to the editing; and
   showing the updated calculation on the virtual tape.

2. The one or more non-transitory computer-readable media of claim 1 including a further step of arranging each of the plurality of virtual tapes to store a sequence of values and operators for a respective plurality of calculations, the sequence of values and operators for the respective plurality of calculations being received via user input on the keypad.

3. The one or more non-transitory computer-readable media of claim 2 including a further step of utilizing each of the plurality of virtual tapes as a user-accessible memory, the user-accessible memory being recallable by the user through the user interface for inclusion as a recalled value in calculations on any of the plurality of virtual tapes.

4. The one or more non-transitory computer-readable media of claim 3 in which the dynamic updating is performed for each of the plurality of virtual tapes that utilizes a recalled value where the recalled value is changed as a result of the editing.

5. The one or more non-transitory computer-readable media of claim 1 including an additional step of configuring the user interface for accepting one of textual comment or annotation from the user, the textual comment or annotation being shown on the virtual tape.

6. The one or more non-transitory computer-readable media of claim 5 in which the user interface is configured so that annotations may be associated on a line-by-line basis with values.

7. A method comprising the steps of:
   providing a calculator application executing on an electronic device with a plurality of virtual tapes, each of the virtual tapes being used by the calculator application to store and display calculations entered by a user through a user interface exposed by the calculator application;
   configuring the user interface for implementing a calculator time mode, the calculator time mode enabling accepting values having units of time, displaying the values having units of time, performing calculations using the values having units of time, and displaying results of the calculations using the units of time, the user interface including a user control for invoking the time mode, the user control being graphically identified using a colon displayed on the user interface;
   configuring the plurality of virtual tapes as a plurality of respective user-accessible memories so that selected data in a virtual tape is linkable to one or more respective virtual tapes in the plurality of virtual tapes, each of the virtual tapes further i) being configured to be selectively viewable by the user for display on the user interface, and ii) including a visible graphic device, the visible graphic device resembling a watermark and providing information to uniquely identify a given virtual tape, each of the user-accessible memories having a memory value that is includable as a recalled value in one or more user-selected virtual tapes, the selecting of the one or more virtual tapes being performed through the user interface; and
   dynamically updating the one or more virtual tapes whenever the memory value is changed.

8. The method of claim 7 including the further steps of exposing a live editing functionality to the user through the user interface so that values or operators in the calculations are selectively changed through editing by the user and recalculating the memory value responsively to the editing.

9. The method of claim 7 including a further step of selectively showing portions of the virtual tape through the user interface in response to user input.

10. The method of claim 8 in which the user interface includes a touchscreen and including a further step of enabling the user to scroll through the selected virtual tape using the touchscreen.

11. The method of claim 7 in which the memory value is the last value on a virtual tape.

12. The method of claim 7 including a further step of exposing functionality through the user interface to input a name for one or more of the virtual tapes in the plurality.

13. An electronic device, comprising:
   storage adapted for storing instructions that when executed during runtime on the electronic device implement a calculator application;

input/output circuitry adapted for receiving input from a user through a user interface implemented by the calculator application during runtime, the input including sequences of values and operators which comprise respective calculations, the user interface being adapted for implementing a calculator time mode, the time mode enabling accepting values having units of time, displaying the values having units of time, performing calculations using the values having units of time, and displaying results of the calculations using the units of time, the user interface including a user control for invoking the time mode, the user control being graphically identified using a colon displayed on the user interface; and control circuitry adapted for i) implementing a plurality of virtual tapes, each of the virtual tapes being used by the calculator application to store the sequences of values and operators and display the calculations to the user through the user interface and each being arranged as a user-accessible memory so that selected data in a virtual tape is linkable to one or more respective virtual tapes in the plurality of virtual tapes, each of the virtual tapes further a) being configured to be selectively viewable by the user for display on the user interface, and b) including a visible graphic device, the visible graphic device resembling a watermark and providing information to uniquely identify a given virtual tape, ii) implementing the user interface for live-editing by the user of the values or the operators in one or more sequences stored on the virtual tapes and, iii) enabling the plurality of virtual tapes to operate as a plurality of respective user-accessible memories, each of the user-accessible memories having a memory value that is includable as a recalled value in one or more user-selected virtual tapes.

14. The electronic device of claim 13 in which the control circuitry is further adapted for dynamically updating the one or more virtual tapes whenever the memory value is changed.

15. The electronic device of claim 13 in which the control circuitry is further adapted for dynamically updating the calculations responsively to the live-editing.

16. The electronic device of claim 15 in which the control circuitry is further adapted for showing updated calculations on the virtual tapes.

17. The electronic device of claim 13 further comprising communications circuitry adapted for e-mailing a user-selected virtual tape to a recipient designated by the user.

18. The electronic device of claim 13 in which the control circuitry is further adapted to expose a facility through the user interface by which the memory values associated with respective user-accessible memories are displayed in summary form.

* * * * *